(12) United States Patent
Saito

(10) Patent No.: US 6,473,385 B1
(45) Date of Patent: Oct. 29, 2002

(54) OPTICAL HEAD, AND OPTICAL RECORDING AND/OR REPRODUCING APPARATUS

(75) Inventor: Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/454,765

(22) Filed: Dec. 3, 1999

(30) Foreign Application Priority Data

Dec. 9, 1998 (JP) .......................................... 10-350539

(51) Int. Cl.⁷ ................................................ G11B 7/00
(52) U.S. Cl. ............................... 369/112.23; 369/44.14; 369/13.33
(58) Field of Search .......................... 369/44.23, 44.14, 369/44.15, 112, 13, 110, 96, 97, 112.24, 126, 112.08, 112.29, 112.12, 112.14, 112.02, 244, 44.12, 112.07, 112.1, 219, 13.33; 359/719, 245; 349/86, 79

(56) References Cited

U.S. PATENT DOCUMENTS

| 5,497,359 A | * | 3/1996 | Mamin et al. ............ 369/44.15 |
| 5,528,575 A | | 6/1996 | Saito ........................... 369/110 |
| 5,615,203 A | * | 3/1997 | Fukakusa ..................... 369/244 |
| 5,687,153 A | * | 11/1997 | Komma et al. ............. 369/110 |
| 5,917,788 A | * | 6/1999 | Mowry ...................... 369/44.23 |
| 5,917,798 A | | 6/1999 | Horimai et al. ............. 369/103 |
| 5,963,532 A | * | 10/1999 | Hajjar ................... 369/112.24 |
| 5,966,362 A | * | 10/1999 | Arai et al. ............. 369/112.23 |
| 6,009,064 A | * | 12/1999 | Hajjar ........................ 369/112 |
| 6,043,940 A | * | 3/2000 | Kamiyama et al. ......... 359/719 |
| 6,108,135 A | * | 8/2000 | Ho ........................... 369/44.14 |
| 6,118,586 A | * | 9/2000 | Tanabe et al. .............. 369/112 |
| 6,181,393 B1 | * | 1/2001 | Enomoto et al. ............. 349/79 |

* cited by examiner

*Primary Examiner*—William Korzuch
*Assistant Examiner*—Kim-Kwok Chu
(74) *Attorney, Agent, or Firm*—Oblon, Spivak, McClelland, Maier & Neustadt, P.C.

(57) ABSTRACT

In an optical head using a solid immersion lens as an objective, there is disposed in the optical path of a return light an optically anisotropic optical element formed not flat at at least one side thereof. The optical element is provided to compensate an uneven distribution of polarized light included in the return light from a recording medium.

10 Claims, 29 Drawing Sheets

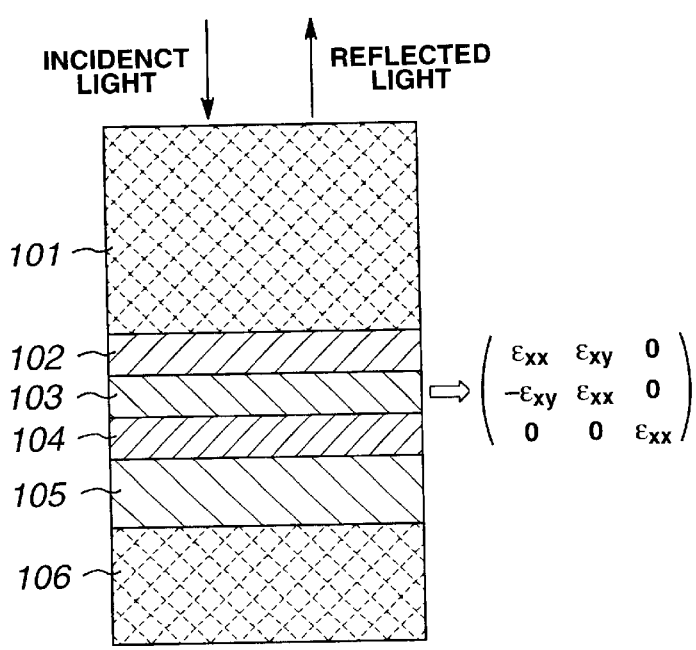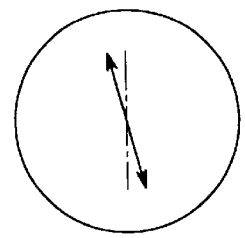
FIG.4A                    FIG.4B

OPTICAL HEAD, AND OPTICAL RECORDING AND/OR REPRODUCING APPARATUS

BACKGROUND OF THE INVENTION

1. Field of the Invention

The present invention relates to an optical head and an optical recording and/or reproducing apparatus, and more particularly, to an optical head adapted use an evanescent light from the end face of a solid immersion lens disposed opposite to a recording medium to write and/or read a signal to and/from the recording medium, and an optical recording and/or reproducing apparatus using the optical head.

2. Description of the Related Art

Referring now to FIG. 1, there is schematically illustrated the construction of a magneto-optical disc (will be referred to as "MO disc" hereinafter) as a recording medium to and/or from which data is magneto-optically written and/or read. The MO disc is generally indicated with a reference 100. As shown, the MO disc 100 comprises a substrate 101, a first dielectric layer 102 formed on the substrate 101 from SiN or the like, a magnetic layer 103 formed on the first dielectric layer 102 from TbFeCo or the like, a second dielectric layer 104 formed on the magnetic layer 103 from SiN or the like, and a light-reflective layer 105 formed on the second dielectric layer 104 from Al or the like. The first dielectric layer 102, magnetic layer 103, second dielectric layer 104 and light-reflective layer 105 form together, a magneto-optical recording multilayer 106 (will be referred to as "MO multilayer" hereinafter). The MO multi-layer thin film 106 has formed thereon a protective layer 107 of an ultraviolet-curable resin or the like.

The MO disc 100 has written thereto a signal as a magnetized direction of the magnetic layer 103. For write and/or read of the signal to and/or from the MO disc 100, a laser light is irradiated from the substrate 101 towards the MO multilayer 106 as shown in FIG. 1.

Referring now to FIG. 2, there is schematically illustrated an example of the conventional optical head used to write and/read a signal to and/or from the above-mentioned MO disc 100. Note that the optical system for focusing servo and tracking servo is not shown in FIG. 2 for the simplicity of illustration and explanation of the optical head. The optical head is generally indicated with a reference 120.

For reading a signal recorded in the MO disc 100 with the aid of the optical head 120 shown in FIG. 2, a laser light is emitted from a laser source 121. It is guided through a collimator lens 122 and beam splitter 123 to be incident upon an objective 124. The laser light incident upon the objective 124 has been linearly polarized as shown in FIG. 3. The laser light incident upon the objective 124 is focused on the MO multilayer 106 of the MO disc 100 through the objective 124.

The light focused on the MO multilayer 106 of the MO disc 100 is reflected by the MO multilayer 106. At this time, the reflected light is changed in polarization state under the polar Kerr effect of the magnetic layer 103, as will be seen from FIGS. 4 and 5.

Note that the magnetized direction of the magnetic layer 103 is represented by a non-diagonal component $\varepsilon_{xy}$ of dielectric tensor. FIG. 4A shows a dielectric tensor $\varepsilon$ f the magnetic layer 103, given by a following expression (1-1). FIG. 4B shows the polarized direction of the reflected light.

$$\begin{pmatrix} \varepsilon_{xx} & \varepsilon_{xy} & 0 \\ -\varepsilon_{xy} & \varepsilon_{xx} & 0 \\ 0 & 0 & \varepsilon_{xx} \end{pmatrix} \quad (1\text{-}1)$$

FIG. 5A shows a dielectric tensor of the magnetic layer 103 whose magnetized direction is opposite to that shown in FIG. 4A, given by a following expression (1-2). FIG. 5B shows the polarized direction of the reflected light.

$$\begin{pmatrix} \varepsilon_{xx} & -\varepsilon_{xy} & 0 \\ \varepsilon_{xy} & \varepsilon_{xx} & 0 \\ 0 & 0 & \varepsilon_{xx} \end{pmatrix} \quad (1\text{-}2)$$

As seen from FIGS. 4 and 5, the polarized direction of a return light from the MO multilayer 106 back to the objective 124 is changed depending upon the magnetized direction of the magnetic layer 103. As shown in FIG. 2, the return light passes through the objective 124 gain and is incident upon the beam splitter 123 which reflects the return light which will thus be taken out.

The return light reflected by the beam splitter 123 and taken out is first incident upon a half-wave plate 125 by which the polarized direction of the return light is rotated 45 deg. as shown in FIG. 6. Note that FIG. 6 shows the polarized direction having been rotated clockwise under the effect of polar Kerr effect of the magnetic layer 103 as shown in FIG. 5.

Next, the return light is incident upon a polarizing beam splitter 126 which will split t into two polarized components whose polarized directions are orthogonal to each other. The polarized component having been transmitted through the polarizing beam splitter 126 will be detected by a first photodetector 127, while the polarized component having been reflected by the polarizing beam splitter 126 will be detected by a second photodetector 128.

Referring now to FIG. 7, there is illustrated how the polarized light is split by the polarizing beam splitter 126. The polarization state of the light incident upon the polarizing beam splitter 126 is in two kinds. One is a case A that the polarized light returns after having the polarized direction thereof rotated through an angle $\theta_k$ as shown in FIG. 7 counterclockwise depending upon the magnetized direction of the magnetic layer 103, and the other is a case B that the polarized light returns after having the polarized direction thereof rotated through an angle $\theta_k$ clockwise depending upon the magnetized direction of the magnetic layer 103. Note that in FIG. 7, the I-axis corresponds to the polarized component transmitted through the polarizing beam splitter 126 and the J-axis corresponds to the polarized component reflected by the polarizing beam splitter 126.

More particularly, the light transmitted through the polarizing beam splitter 126 (namely, the light detected by the first photodetector 127) is a projection of the polarized light beams indicated with references A and B, respectively, onto the I-axis as in FIG. 7, and the light reflected by the polarizing beam splitter 126 (namely, the light detected by the second photodetector 128) is a projection of the polarized light beams indicated with references A and B, respectively, onto the J-axis as in FIG. 7. Thus, in the case of the polarized light beam A, J>I, and in the case of the polarized light beam B, J<I. A magneto-optical signal (will be referred to as "MO signal" hereinafter) indicative of a magnetized direction of the magnetic layer 103 is detected as a difference ($|I|^2-|J|^2$) between an intensity of the polarized light detected by the first photodetector 127 and an intensity of the polarized light detected by the second photodetector 128.

In the magneto-optical disc system, the recording density can effectively be increased by focusing a laser light used for write and/or read of a signal through an objective having a larger numerical aperture (NA) which will lead to a smaller diameter of a light spot focused by the objective and thus to a higher resolution.

The diameter of the light spot focused by the objective is generally expressed by $\lambda/NA$ where $\lambda$ is a wavelength of a laser light used for write and/or read and NA is a numerical aperture of the objective. Also, the numeral aperture (NA) of the objective is expressed by $n \cdot \sin \theta$ where n is a refractive index of a medium and $\theta$ is an angle of marginal light incident upon the objective. Therefore, when the medium is air (that is, n=1), the NA of the objective cannot exceed 1.

For an NA larger than 1, an optical head has been proposed in which a solid immersion lens (will be referred to as "SIL" hereinafter) is used as an objective. The SIL is supported opposite to an MO disc with a space between them, the space being smaller than the wavelength of a light used for write and/or read of a signal to and/or from the MO disc. The optical head using the SIL is adapted such that a collimated light beam is incident upon the SIL and the majority of the incident light beam is totally reflected at the end face of the SIL. An evanescent light leaking from the end face of the SIL is used for write and/or read of a signal to and/or from the MO disc. If the SIL uses therein a medium whose refractive index is n>1, the NA can be made larger than 1.

Note that in the optical head using the SIL, the collimated light beam is incident upon the SIL such that the majority of the incident light beam is totally reflected at the end face of the SIL as mentioned above and the evanescent light leaking from the end face of the SIL reaches the MO disc. Therefore, the central light and marginal light of a collimated light beam incident upon the SIL will be incident upon the MO disc at different angle, respectively. The angle of the central light upon the MO disc is greatly difference from that of the marginal light.

When the SIL is used in the optical head, it is optically desirable that there should not exist no space between the SIL and MO disc. Nevertheless, some space should be between the SIL and MO disc since the MO disc has to be driven to spin at a high speed during write and/or read of a signal to and/or from the MO disc. However, the evanescent light leaking from the end face of the SIL will exponentially be attenuated as it goes away from the SIL end face. Therefore, for the evanescent light to sufficiently reach the MO disc, the space between the SIL and MO disc has to be sufficiently narrower than the wavelength of a light used for write and/or read of a signal to and/or from the MO disc.

For the aforementioned reasons, in case an SIL is used in the optical head, there will unavoidably be provided between the SIL and MO disc an air layer whose thickness is smaller than the wavelength of a light used for write and/or read of a signal to and/or from the MO disc. Therefore, the MO disc may be considered to have a, multi-layer optical thin film opposite to the SIL and which includes the air layer as well as the MO multilayer. That is, an incident light upon the SIL will be reflected by the multi-layer optical thin film including the MO multilayer and air layer.

Generally, when an incident light is reflected by the multi-layer optical thin film including the air layer, the phase difference and reflectance of the reflected light will vary depending upon the polarized direction, angle of incidence, etc. of the incident light. Thus, in an optical head using an SIL as an objective, a light returned, by reflection, from the multi-layer optical thin film including the air layer will unevenly be distributed when polarized. The uneven distribution of the polarized beams will cause the signal-to-noise ratio (SNR) to be worse especially when the MO signal is detected, for the MO signal is detected though detection of a polarized direction of the light returned, by reflection, from the multi-layer optical thin film As in the foregoing, although the employment of the SIL permits to use an objective having a larger NA in an optical head, it gives birth to a new problem that the light returned, by reflection, from the multi-layer optical thin film including the air layer will unevenly be distributed when polarized.

OBJECT AND SUMMARY OF THE INVENTION

Accordingly, the present invention has an object to overcome the above-mentioned drawbacks of the prior art by providing an optical head using a solid immersion lens as an object and capable of detecting a quality signal from a light returned, by reflection, from a recording medium by compensating the above-mentioned uneven distribution of polarized light. It is another object of the present invention to provide an optical recording and/or reproducing apparatus using the optical head.

The above object can be attained by providing an optical head comprising according to the present invention:
 a solid immersion lens supported opposite to a recording medium with a space between them, the space being smaller than the wavelength of a light used for write and/or read of a signal to and/or from the recording medium, an evanescent light from the end face of the solid immersion lens being used for write and/or read of a signal to and/or from the recording medium; and
 an optically anisotropic optical element formed not flat at at least one side thereof and disposed in the optical path of the light used for write and/or read of a signal to and/or from the recording medium.

The other object can be attained by providing an optical recording and/or reproducing apparatus using an optical head for write and/or read of a signal to and/or from a recording medium, the optical head comprising according to the present invention:
 a solid immersion lens supported opposite to a recording medium with a space between them, the space being smaller than the wavelength of a light used for write and/or read of a signal to and/or from the recording medium, an evanescent light from the end face of the solid immersion lens being used for write and/or read of a signal to and/or from the recording medium; and
 an optically anisotropic optical element formed not flat at at least one side thereof and disposed in the optical path of the light used for write and/or read of a signal to and/or from the recording medium.

In the above-mentioned optical head and recording and/or reproducing apparatus according to the present invention, during write and/or read of a signal to and/or from the recording medium, an uneven distribution of polarized light included in a light returned; by reflection, from the recording medium can be compensated by the optical element. Therefore, according to the present invention, the solid immersion lens is adopted and a quality signal can be detected from the return light from the recording medium by compensating the uneven distribution of polarized light.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIGS. 4A and 4B show how the polarization state of a reflected light from an MO multilayer in the magneto-optical disc is changed under the polar Kerr effect of a magnetic layer;

DETAILED DESCRIPTION OF THE PREFERRED EMBODIMENTS

Prior to proceeding to the description of the embodiment of the present invention, there will be explained hereinbelow an optical head using therein a solid immersion lens to write and/or read a signal to and/or from a magneto-optical disc but which is constructed not according to the present invention.

Figure 8:
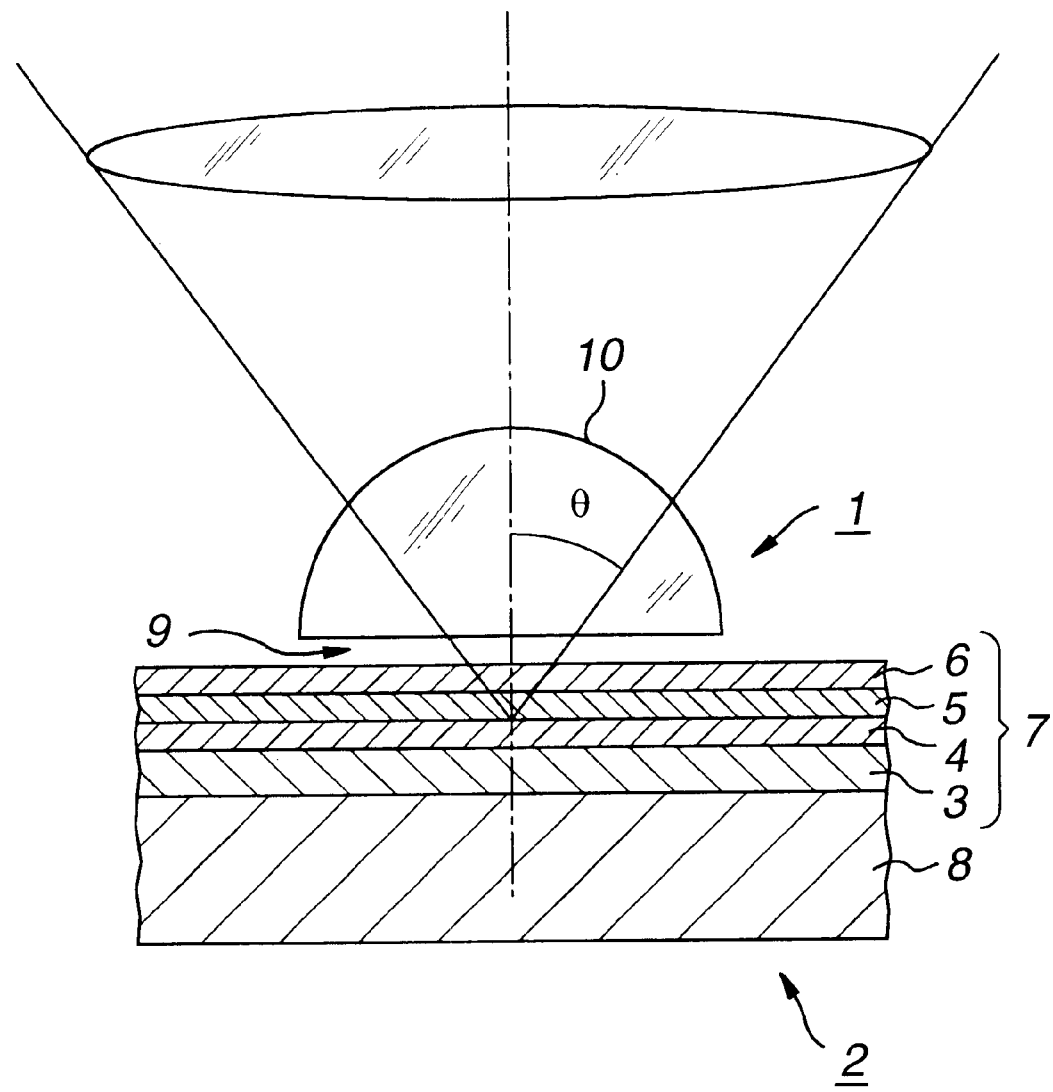
FIG. 8 shows an example of solid immersion lens, and an example of magneto-optical disc.

Referring now to FIG. 8, there is illustrated, enlarged in scale, a solid immersion lens used in an optical head to write and/or read a signal to and/or from a magneto-optical disc. The solid immersion lens and magneto-optical disc are generally indicated with references 1 and 2, respectively. In case the solid immersion lens (will be referred to as "SIL" hereinafter) 1 is used in the optical head, it is disposed opposite to the magneto-optical disc (will be referred to as "MO disc" hereinafter) 2 with a narrow gap between them, as shown in FIG. 8. The gap is smaller than the wavelength of a light used for write and/or read of a signal to and/or from the MO disc 2. As shown in FIG. 8, the MO disc 2 comprises a substrate 8, and a magneto-optical multilayer 7 including a light-reflective layer 3 formed on the substrate 8 from Al or the like, a first dielectric layer 4 formed on the light-reflective layer 3 from SiN or the like, a magnetic layer 5 formed on the first dielectric layer 4 from TbFeCo or the like, and a second dielectric layer 6 formed on the magnetic layer 5 from SiN or the like. In the MO disc 2 shown in FIG. 8, the magneto-optical multilayer (will be referred to as "MO multilayer" hereinafter) 7 has no protective layer formed thereon to minimize the space between the MO multilayer 7 and the SIL 1, and a light is incident upon the MO disc 2 from the MO multilayer 7.

As shown in FIG. 8, in case the SIL 1 is used in the optical head, there will unavoidably be provided between the SIL 1 and MO disc 2 an air layer 9 whose thickness is smaller than the wavelength of a light used for write and/or read of a signal to and/or from the MO disc 2. Therefore, the MO disc 2 may be considered to have a multi-layer optical thin film opposite to the SIL 1 and which includes the air layer 9 as well as the MO multilayer 7. Thus, in the following description, the air layer 9 and MO multilayer 7 will collectively be referred to as "multi-layer optical thin film".

The SIL 1 has a light-incident surface 10 which is formed generally spheric. Therefore, a light incident at an angle upon the SIL 1 through air is transmitted through the SIL 1 in the same angular direction. If the SIL 1 has a refractive index of n>1, it can have a numerical aperture NA (=n·sin θ) of larger than 1 even if marginal light is incident upon the SIL 1 at an angle θ of less than 90 deg.

Figure 9:
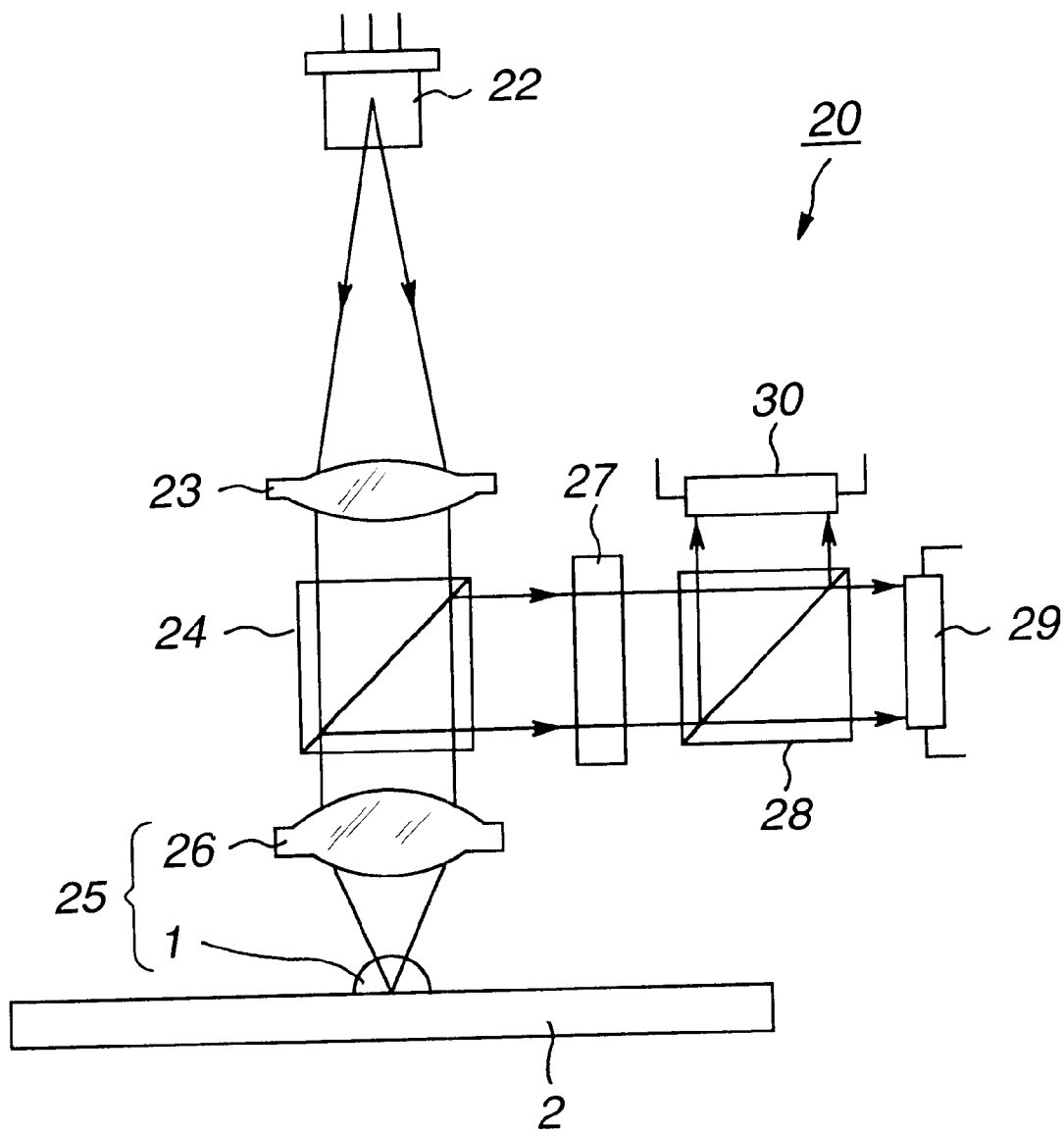
FIG. 9 shows the construction of an example of conventional optical head using the solid immersion lens.

Referring now to FIG. 9, there is schematically illustrated an example of conventional optical head using the SIL 1 as an objective. Note that the optical system for focusing servo and tracking servo is not shown in FIG. 9 for the simplicity of illustration and explanation of the optical head. The optical head is generally indicated with a reference 20.

Figure 1:
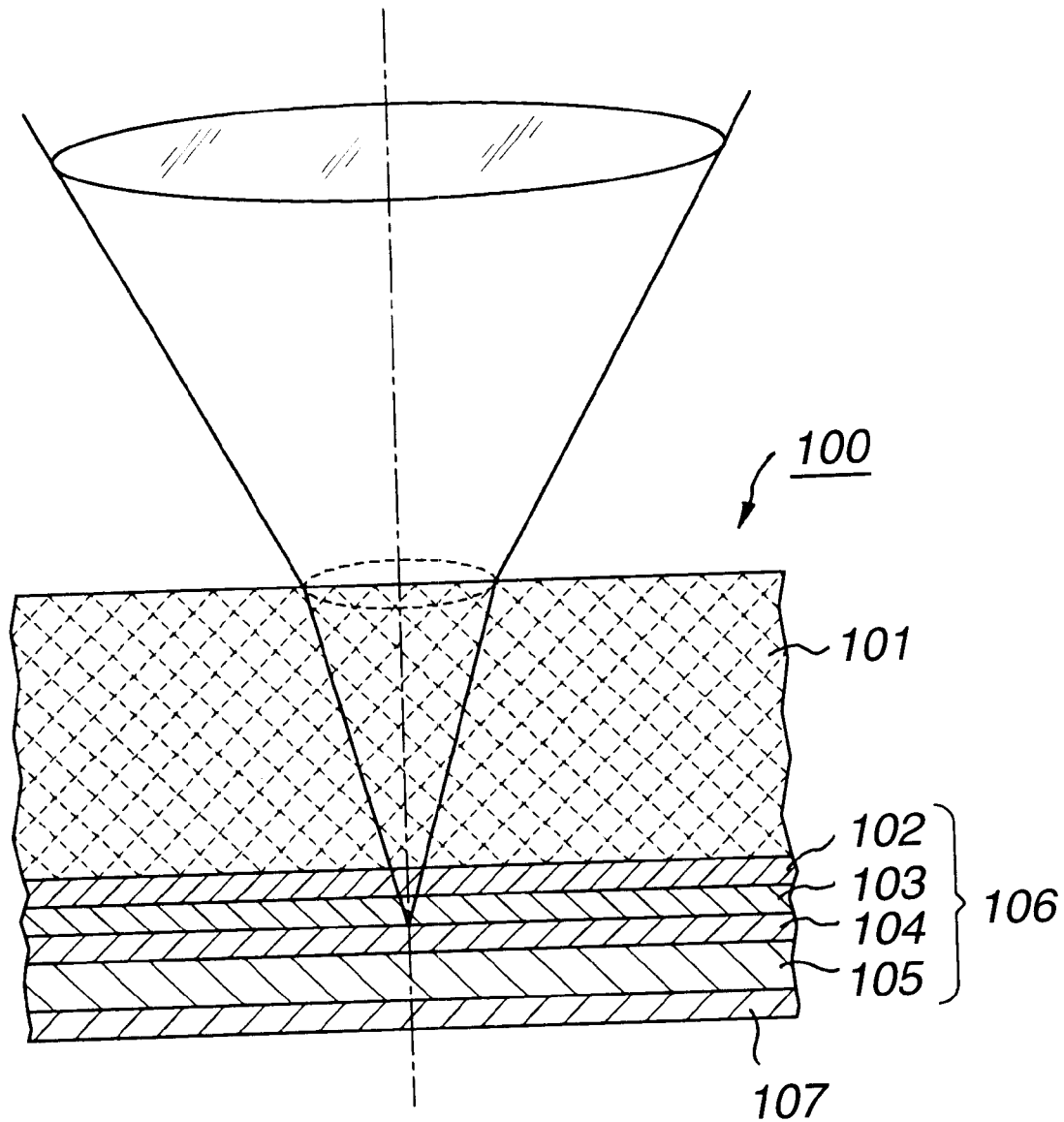
FIG. 1 shows an example of the conventional magneto-optical discs.
Figure 2:
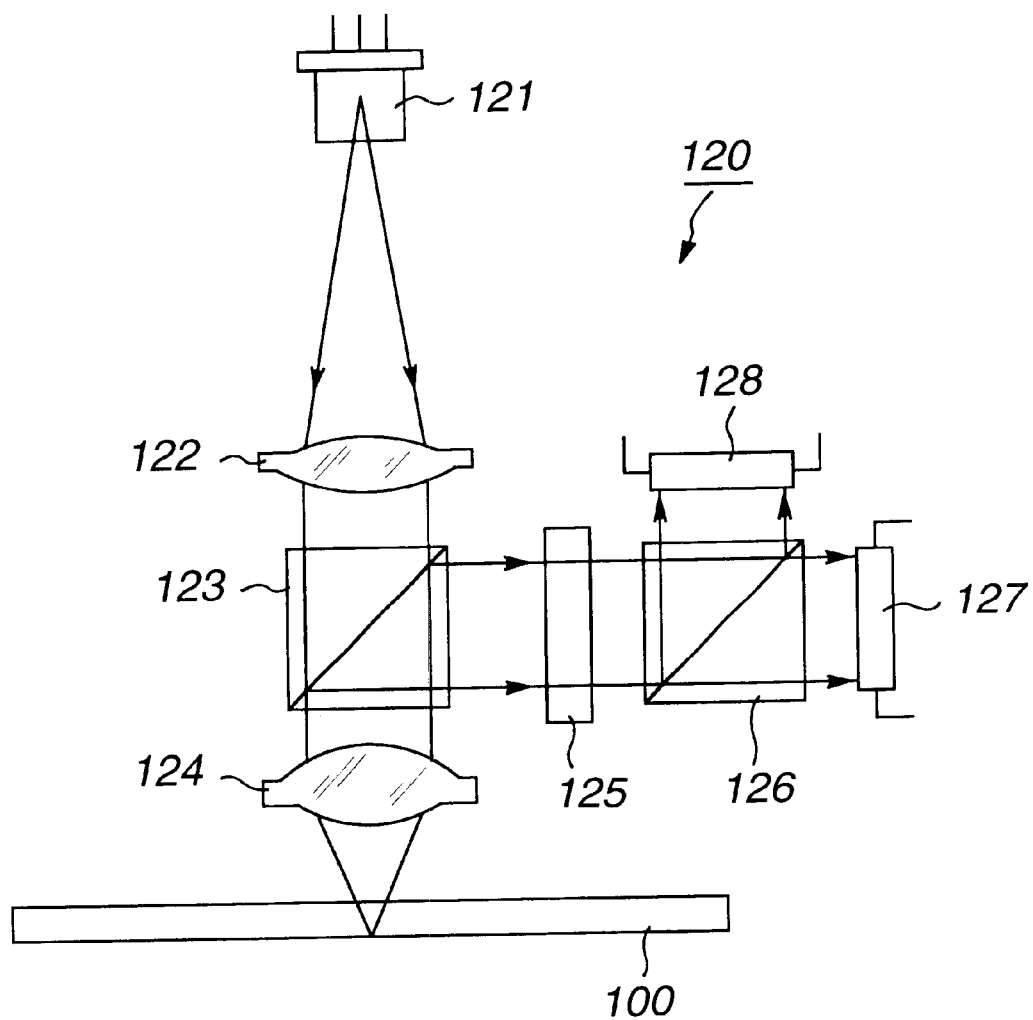
FIG. 2 shows an example of the conventional optical heads.
Figure 3:
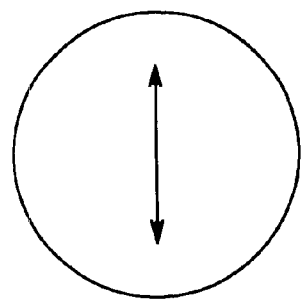
FIG. 3 shows the polarized direction of an incident light upon an objective lens in the optical head shown in FIG. 2.
Figure 5A:
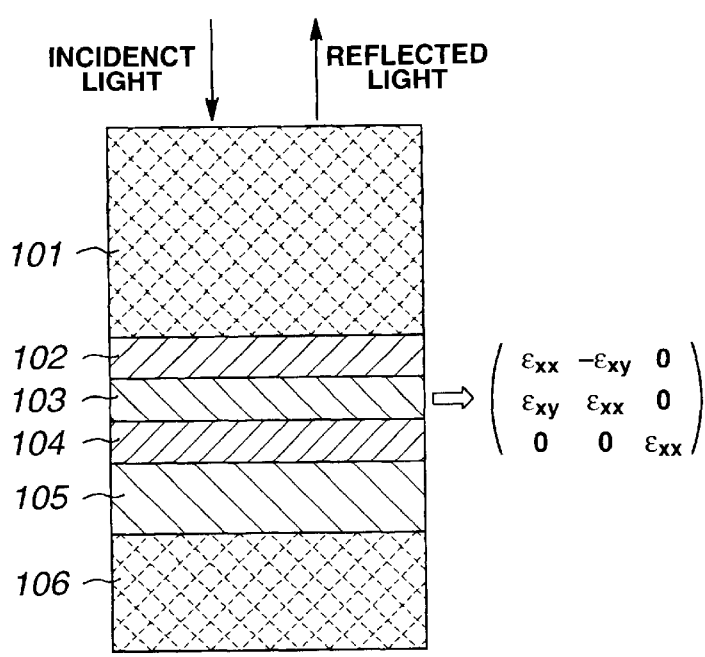
FIGS. 5A and 5B show how the polarization state of a reflected light from the MO multilayer in the magneto-optical, disc is changed under the polar Kerr effect of the magnetic layer.
Figure 5B:
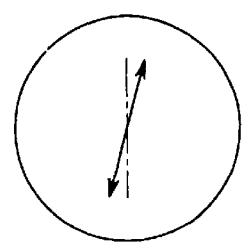
Figure 6:
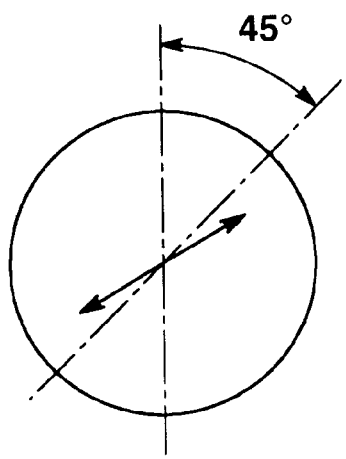
FIG. 6 shows the polarized direction of a return light whose polarized direction has been rotated 45 deg. when the return light passes though a half-wave plate in the optical head in FIG. 2.
Figure 7:
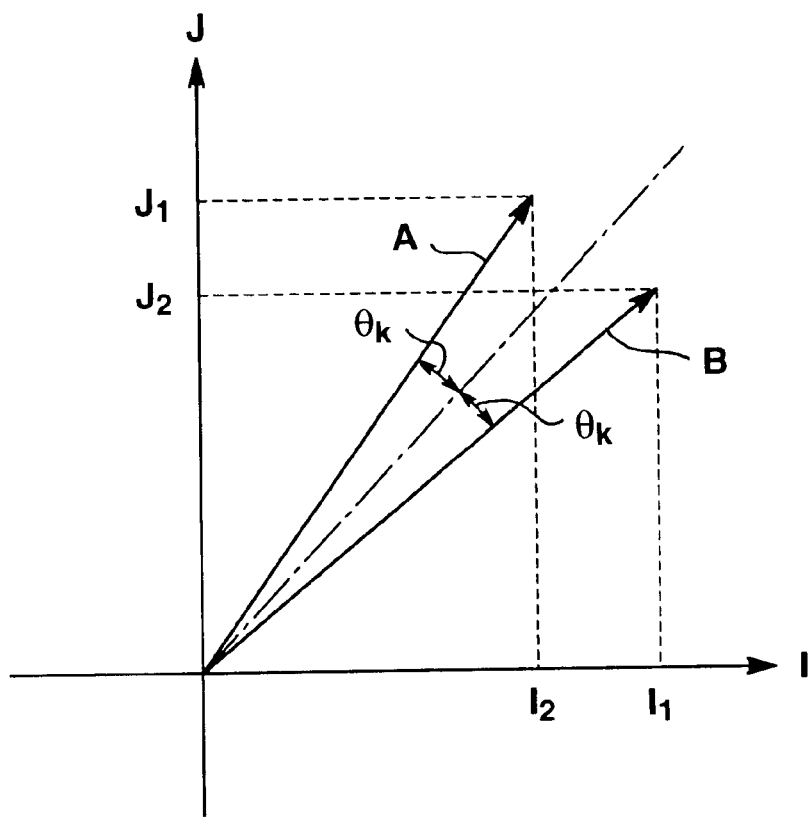
FIG. 7 shows the principle of detecting a magneto-optical signal.

The optical head 20 is constructed similarly to the optical head 120 shown in FIG. 2 except that two pieces of the SIL 1 are used as an objective lens. For reading a signal recorded in the MO disc 2 with the aid of the optical head 20, a laser light is emitted from a laser source 22, and guided to be incident upon an objective 25 through a collimator lens 23 and beam splitter 24.

The objective 25 comprises a first lens 26 which converges the laser light having been transmitted through the beam splitter 24, and the SIL 1 disposed opposite to the MO disc 2. Thus, the laser light incident upon the objective 25 is first converged by the first lens 26 and then incident upon the SIL 1, and thus focused on, or in the proximity of, the end face of the SIL 1.

The incident laser light focused on, or in the proximity of, the end of the SIL 1 is reflected by the multi-layer optical thin film. More specifically, the majority of the incident laser light is totally reflected at the end face of the SIL 1, whereas a part of the incident laser light reaches the MO multilayer 7 of the MO disc 2 as an evanescent light leading from the end face of the SIL 1. The part of the incident laser light is thus reflected by the MO multilayer 7.

A light returned, by reflection, from the multi-layer optical thin film is changed in polarization state depending upon the magnetized direction of the magnetic layer 5 under the polar Kerr effect of the magnetic layer 5 forming a part of the MO multilayer 7. The return light is passed through the SIL 1 and first lens 26 and incident upon the beam splitter 24 where it will be reflected and taken out.

The return light reflected by the beam splitter 24 and thus taken out is guided to be incident, through a half-wave plate 27, upon a polarizing beam splitter 28 where it will be split into two polarized components whose polarized directions are orthogonal to each other.

Of the polarized components split by the polarizing beam splitter 28, one having been transmitted through the polarizing beam splitter 28 is detected by a first photodetector 29, whereas the other polarized component reflected by the polarizing beam splitter 28 is detected by a second photodetector 30. A magneto-optical signal indicative of a magnetized direction of the magnetic layer 5 is detected as a difference ($|I|^2-|I|^2$) between an intensity of the polarized light detected by the first photodetector 29 and an intensity of the polarized light detected by the second photodetector 30;

Next, a light returned, by reflection, from the multi-layer optical thin film to the first lens 26 is optically distributed in the aforementioned optical head 20, as will be described below.

To determine an optical distribution of a return light, it is necessary to first calculate a reflected light which will result from a light incident obliquely at an angle upon the multi-layer optical thin film. The multi-layer optical thin film includes the magnetic layer 5 whose magnetization is represented by a dielectric tensor having a non-diagonal component given by either a following expression (2-1) or (2-2):

$$\begin{pmatrix} \varepsilon_{xx} & \varepsilon_{xy} & 0 \\ -\varepsilon_{xy} & \varepsilon_{xx} & 0 \\ 0 & 0 & \varepsilon_{xx} \end{pmatrix} \quad (2\text{-}1)$$

$$\begin{pmatrix} \varepsilon_{xx} & -\varepsilon_{xy} & 0 \\ \varepsilon_{xy} & \varepsilon_{xx} & 0 \\ 0 & 0 & \varepsilon_{xx} \end{pmatrix} \quad (2\text{-}2)$$

Figure 10:
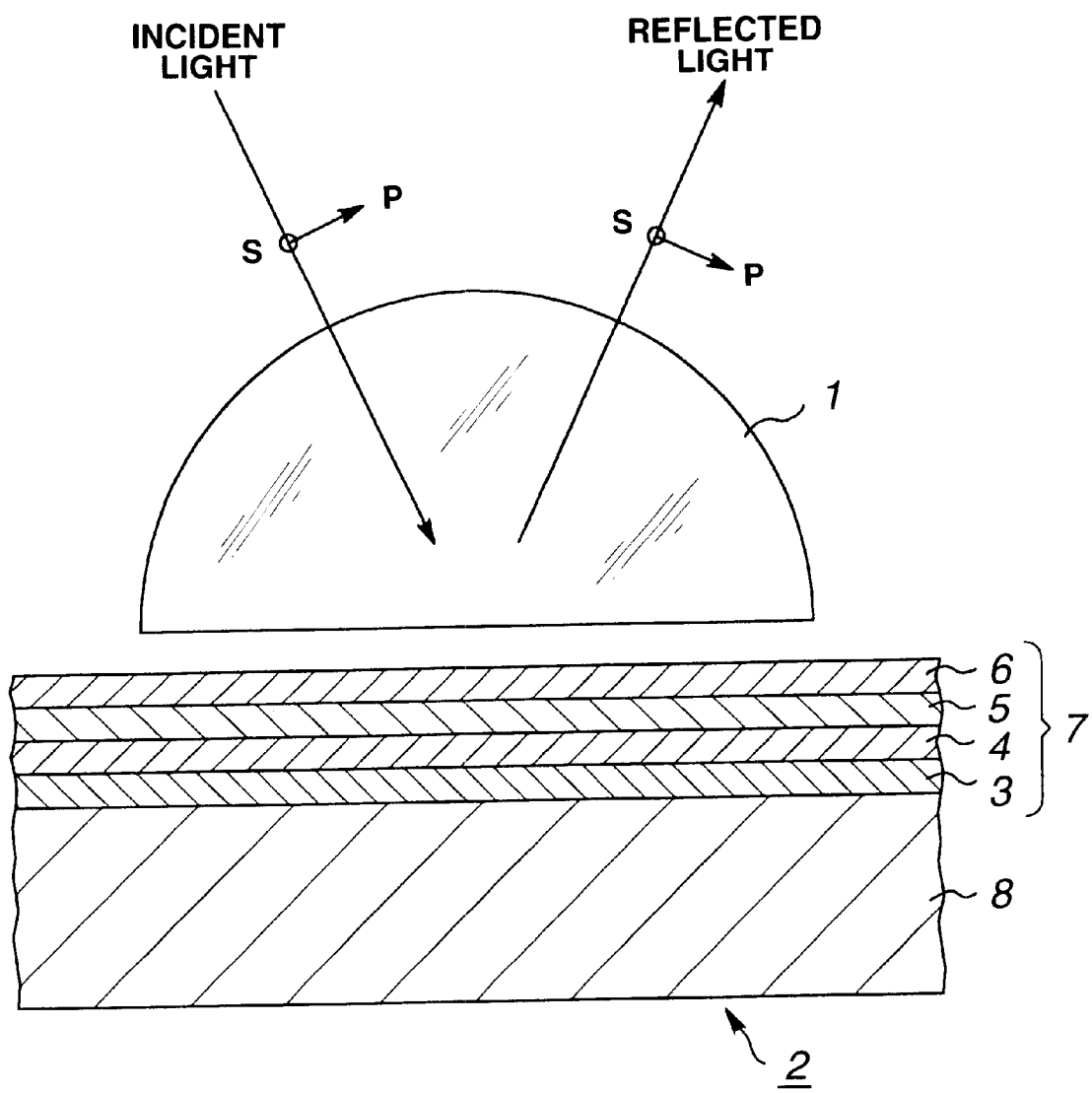
FIG. 10 shows a light incident obliquely at an angle upon a multi-layer optical thin film consisting of an air layer and MO multilayer, and a reflected light from the multi-layer optical thin film.

Referring now to FIG. 10, there is illustrated a light incident obliquely at an angle upon a multi-layer optical thin film consisting of an air layer and MO multilayer, and a reflected light from the multi-layer optical thin film. As shown in FIG. 10, the reflected light resulted from the light incident obliquely at an angle upon the multi-layer optical thin film does not include only a P-polarized reflected light resulted, by reflected, from a P-polarized incident component and an S-polarized reflected light resulted, by reflection, from an S-polarized incident component, but also an S-polarized reflected light resulted, by reflection, from the P-polarized incident component and a P-polarized reflected light resulted, by reflection, from the S-polarized incident component.

It is assumed here that when the P-polarized incident component is reflected, the reflectance of the P-polarized reflected component is $r_{pp}$ and that of the S-polarized reflected component is $r_{ps}$. Also it is assumed that when the S-polarized incident component is reflected, the reflectance of the P-polarized reflected component is $r_{sp}$ and that of the S-polarized reflected component is $r_{ss}$. Taking the above kinds of reflectance in consideration, the reflectivity of the multi-layer optical thin film can be represented by a matrix given by a following expression (2-3). Note that the matrix is applied to an optical system using the SIL 1. In this case, $r_{sp} \approx r_{ps}$.

$$\begin{pmatrix} r_{ss} & r_{sp} \\ r_{ps} & r_{pp} \end{pmatrix} \quad (2\text{-}3)$$

Note that the method of calculating these kinds of reflectance is referred in detail to the article of M. Mansuripur "Analysis of Multilayer thin-film structures containing magneto-optic and anisotropic medium at oblique incidence using 2*2 matrices", J. Appl. Phys. 67, (1990), for example.

Figure 11:
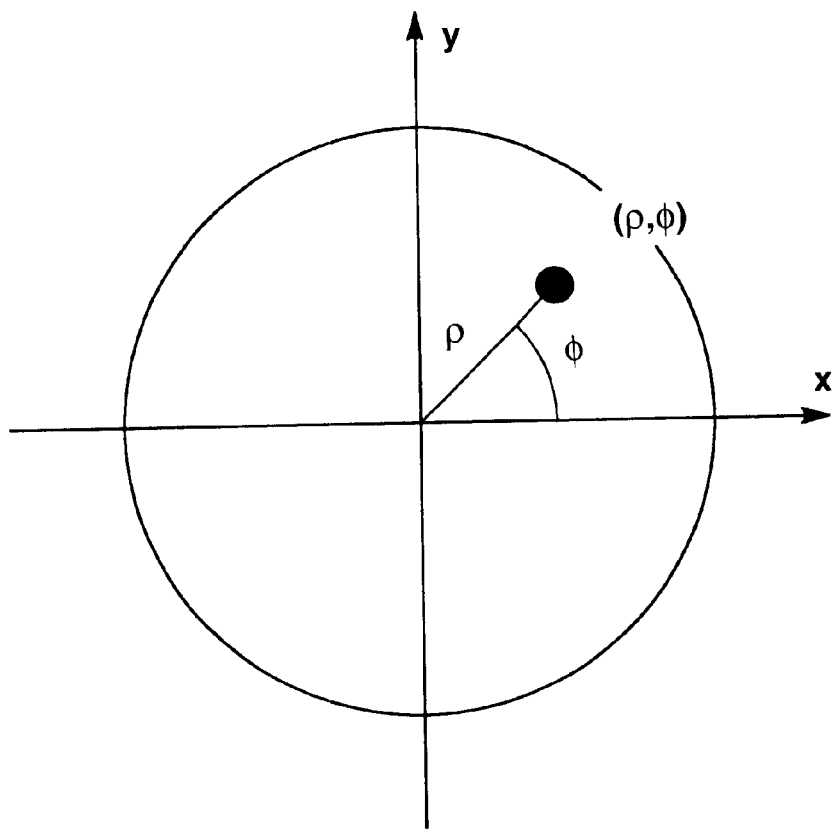
FIG. 11 defines a coordinate on a first lens.

Next, a distribution of a return light upon the first lens 26 is calculated. FIG. 11 defines a coordinate on the first lens 26. The distribution of the return light on the x-y coordinate shown in FIG. 11 is calculated.

Figure 12:
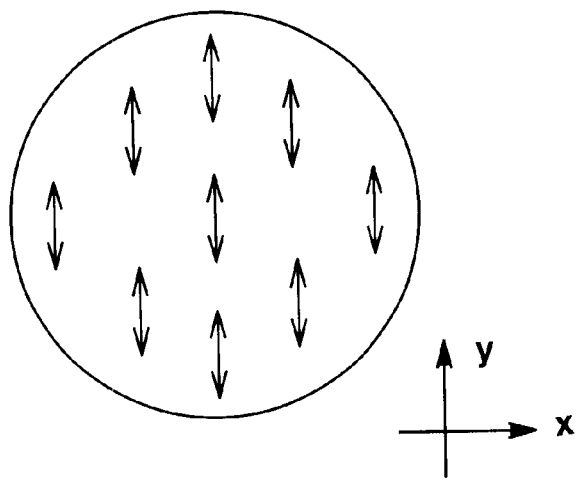
FIG. 12 schematically illustrates the polarization state of an incident laser light.

FIG. 12 schematically illustrates the polarization state of an incident laser light. Assuming that the incident laser light upon the multi-layer optical thin film is a uniform linearly polarized light within the light beam as shown in FIG. 12, the incident laser light is given by a following expression (2-4).

$$\begin{pmatrix} E_x^i \\ E_y^i \end{pmatrix} = \begin{pmatrix} 0 \\ 1 \end{pmatrix} \quad (2\text{-}4)$$

where $E_x^i$ is an electric field component of the incident laser light in the x-axial direction of the and $E_y^i$ is an electric field component of the incident laser light in the y-axial direction.

Figure 13:
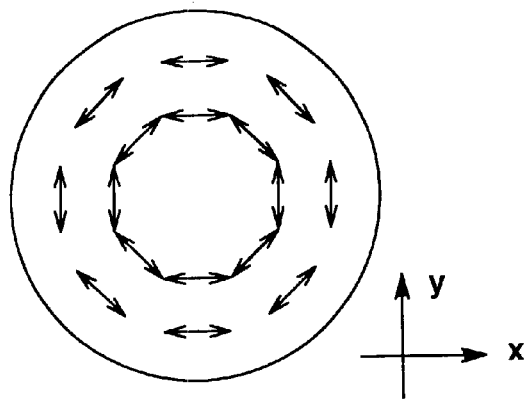
FIG. 13 shows the polarized direction of an S-polarized component of an incident laser light incident upon the multi-layer optical thin film.
Figure 14:
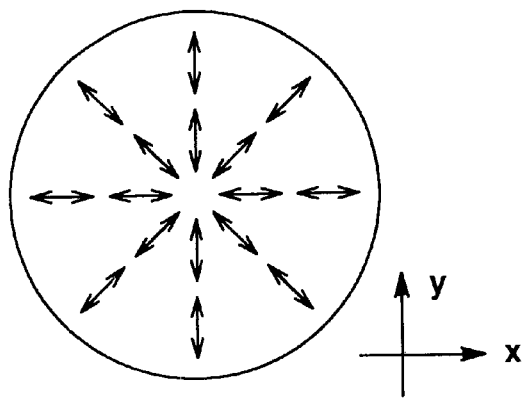
FIG. 14 shows the polarized direction of a P-polarized component of an incident laser light incident upon the multi-layer optical thin film.
Figure 15:
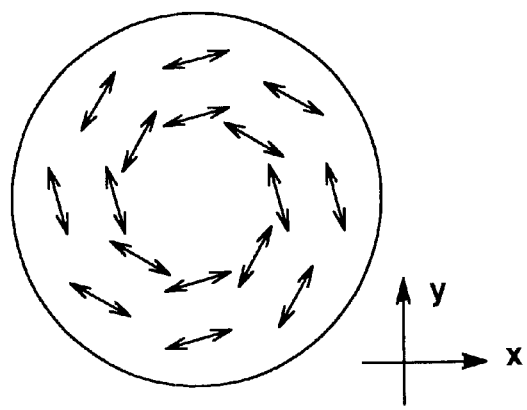
FIG. 15 shows the polarized direction of a return light of an S-polarized component of a laser light incident upon the multi-layer optical thin film and having undergone a Kerr rotation.
Figure 16:
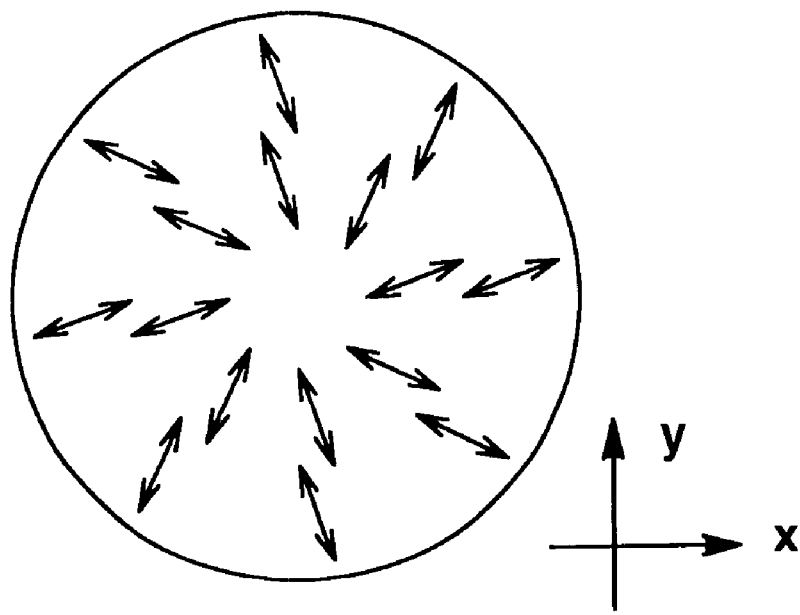
FIG. 16 shows the polarized direction of a return light of a P-polarized component of a laser light incident upon the multi-layer optical thin film and having undergone a Kerr rotation.
Figure 17:
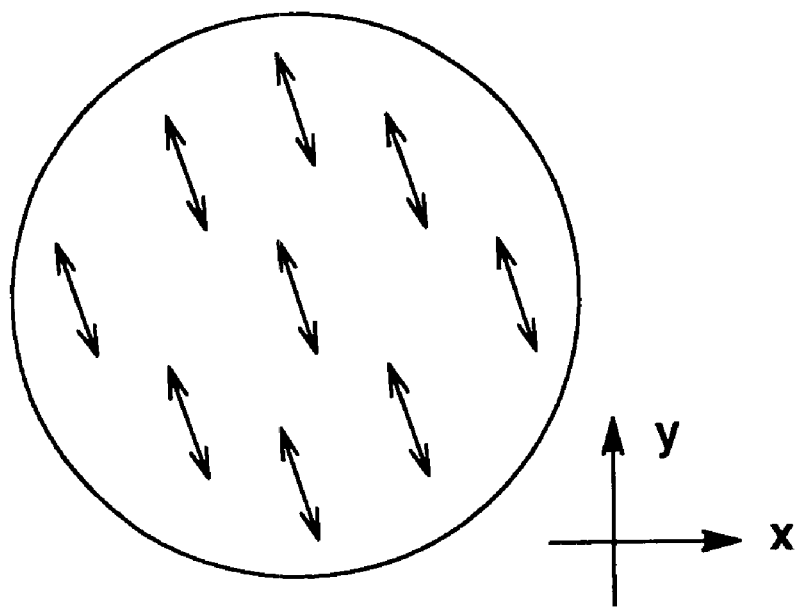
FIG. 17 shows the polarized direction of a return light of a laser light incident upon the multi-layer optical thin film and having undergone a Kerr rotation.

FIG. 13 shows the polarized direction of the S-polarized component of the incident laser light incident upon the multilayer optical thin film, and FIG. 14 shows the polarized direction of the P-polarized component of the incident laser light incident upon the multi-layer optical thin film. Also, FIG. 15 shows the polarized direction of a return light of the S-polarized component of the laser light incident upon the multi-layer optical thin film and having undergone a Kerr rotation, and FIG. 16 shows the polarized direction of a return light of the P-polarized component of the laser light incident upon the multi-layer optical thin film and having undergone a Kerr rotation. Further, FIG. 17 shows the polarized direction derived from combination of the polarized directions shown in FIGS. 15 and 16 (namely, the polarized direction of a return light of the laser light incident upon the multi-layer optical thin film and having undergone a Kerr rotation). As shown in these Figures, when the incident laser light is reflected by the multi-layer optical thin film, the polarization state is changed.

To determine a distribution on the x-y coordinate of the return light having thus been changed in polarization state, the incident laser light should be split into the S-polarized component and P-polarized component with respect to the multi-layer optical thin film, they be multiplied by the reflectance given by the expression (2-3) and then represented again on the x-y coordinate. This can be given by a following mathematical expression (2-5).

$$\begin{pmatrix} E_x^o \\ E_y^o \end{pmatrix} = \begin{pmatrix} \cos\phi & \sin\phi \\ -\sin\phi & \cos\phi \end{pmatrix} \begin{pmatrix} r_{ss} & r_{sp} \\ r_{ps} & r_{pp} \end{pmatrix} \begin{pmatrix} \cos\phi & -\sin\phi \\ \sin\phi & \cos\phi \end{pmatrix} \begin{pmatrix} E_x^i \\ E_y^i \end{pmatrix} \quad (2\text{-}5)$$

where $E_x^o$ is an electric field component of the return light in the x-axial direction and $E_y^o$ is an electric field component of the return light in the y-axial direction.

Therefore, the distribution of the light returned, by reflection, from the multi-layer optical thin film to the first lens 26 is given by a following expression (2-6).

$$\begin{pmatrix} E_x^o \\ E_y^o \end{pmatrix} = \begin{pmatrix} \cos\phi\,\sin\phi\cdot(r_{pp}-r_{ss})\cos^2\phi\cdot r_{ps}-\sin^2\phi\cdot r_{sp} \\ \cos^2\phi\cdot r_{ss}+\sin^2\phi\cdot r_{pp}+\cos\phi\,\sin\phi\cdot(r_{sp}+r_{ps}) \end{pmatrix} \quad (2\text{-}6)$$

As previously described, the return light is reflected by the beam splitter 24 and taken out, and then incident upon the polarizing beam splitter 28 through the half-wave plate 27. Then, the return light is split by the polarizing beam splitter 28 into two polarized components whose polarized direction are orthogonal to each other. One of the polarized components is detected by the first photodetector 29, and the other is detected by the second photodetector 30. A magneto-optical signal (will be referred to as "MO signal" hereinafter) indicative of a magnetized direction of the magnetic layer 5 is detected as a difference (will be referred to as "MO detected quantity of light" hereinafter) between an intensity of the polarized component detected by the first photodetector 29 and an intensity of the polarized component detected by the second photodetector 30.

When the MO detected quantity of light is expressed as "MO", it is given by a following expression (2-7).

$$MO = 4 \cdot Re((\cos^2\phi \cdot r_{ss} + \sin^2\phi \cdot r_{pp})^*(\cos\phi \cdot \sin\phi \cdot (r_{pp} - r_{ss}) + r_{ps})) \quad (2\text{-}7)$$

where Re is a real part and * indicates a complex conjugate. It is assumed herein that r equals $-r_{ps}$.

Note that a magnetized direction of the magnetic layer 5 is detected based on a difference between an MO detected quantity of light obtained when the magnetic layer 5 is magnetized upward and an MO detected quantity of light obtained when the magnetic layer 5 is magnetized downward. In case the direction in which the magnetic layer 5 is magnetized is detected based on an MO detected quantity of light, the MO detected quantity of light should desirably be large and the MO detected quantity of light be uniformly distributed within the entire return light beam. Next, the distribution of the MO detected quantity of light will be described.

First, the result of calculation of a distribution of the MO detected quantity of light within a return light beam, made on the assumption that the numerical aperture NA of the SIL 1 is 1.5 and the air layer 9 between the SIL 1 and MO multilayer 7 is 100 nm thick, will be described.

Figure 18:
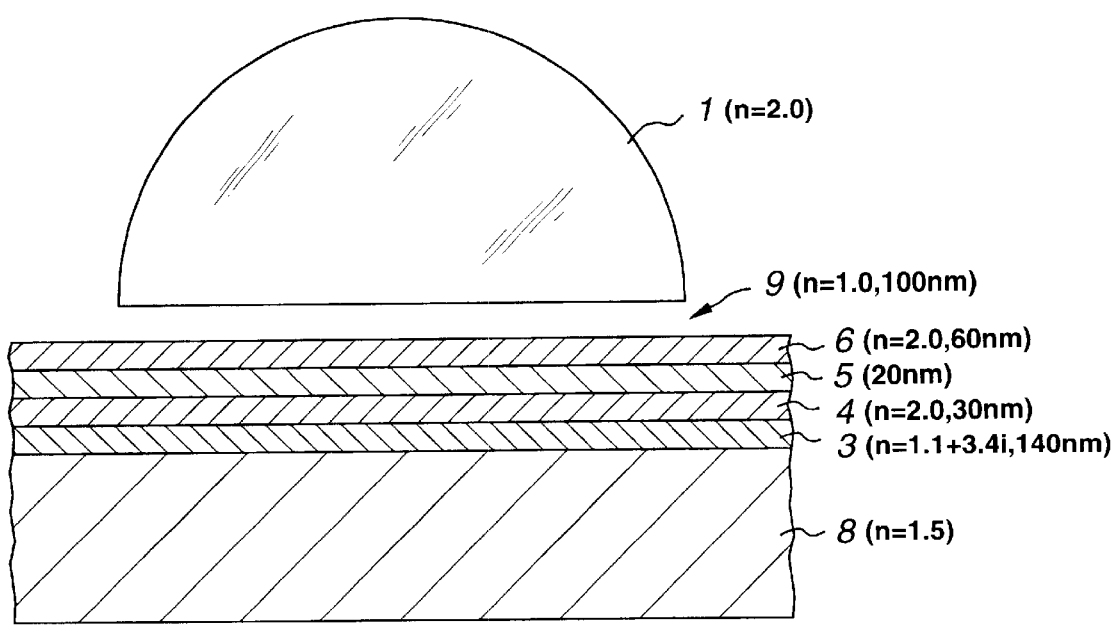
FIG. 18 shows, by way of example, required specifications of the solid immersion lens and multi-layer optical thin film.

Referring now to FIG. 18, there are shown, by way of example, required specifications of the SIL 1 and MO multilayer 7. As shown, it is assumed herein that the: SIL 1 has a refractive index of n=2.0, the air layer 9 between the SIL 1 and MO multilayer 7 is 100 nm in thickness as mentioned above, the second dielectric layer 6 is formed from SiN having a refractive index of n=2.0 and a thickness of 60 nm, the magnetic layer 5 is 20 nm thick, components of the dielectric tensor are $\in_{xx}$=−4.063+15.44i and $\in_{xy}$= 0.2337−0.08722i, respectively, the first dielectric layer 4 is formed from SiN having a refractive index of n=2.0 and a thickness of 30 nm, the light-reflective layer 3 is formed from Al having a complex refractive index of n=1.1+3.4i and a thickness of 140 nm, and the substrate 8 has a refractive index of n=1.5 and a sufficiently large thickness as compared with the light wavelength.

Figure 19:
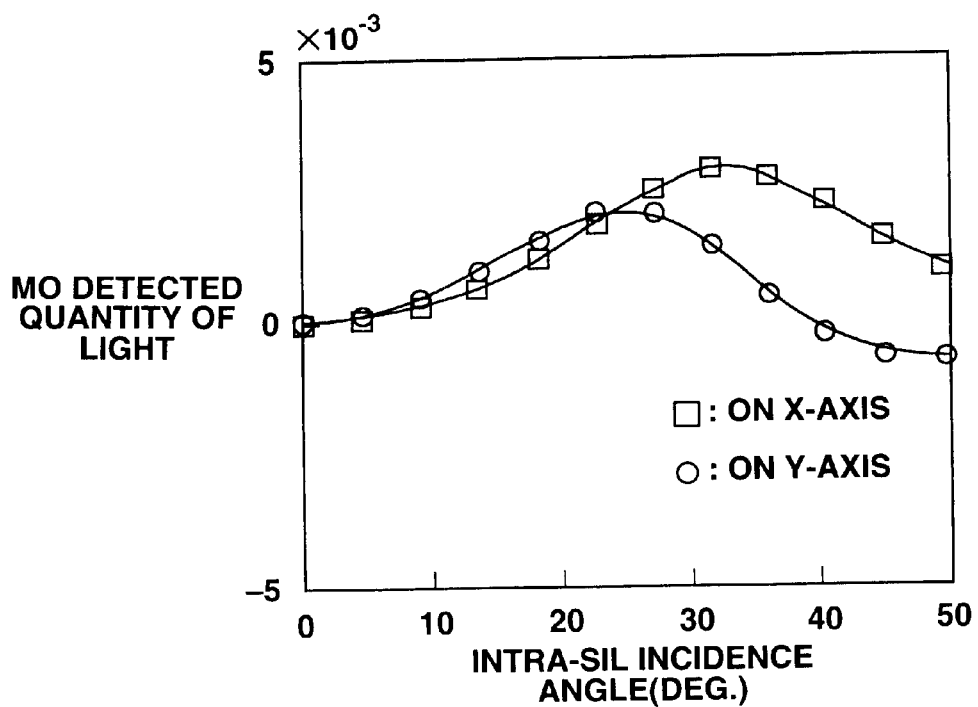
FIG. 19 shows a distribution on the x- and y-axes of MO detected quantity of light within the return light beam when the solid immersion lens and multi-layer optical thin film are constructed to meet the requirements specified in FIG. 18.
Figure 20:
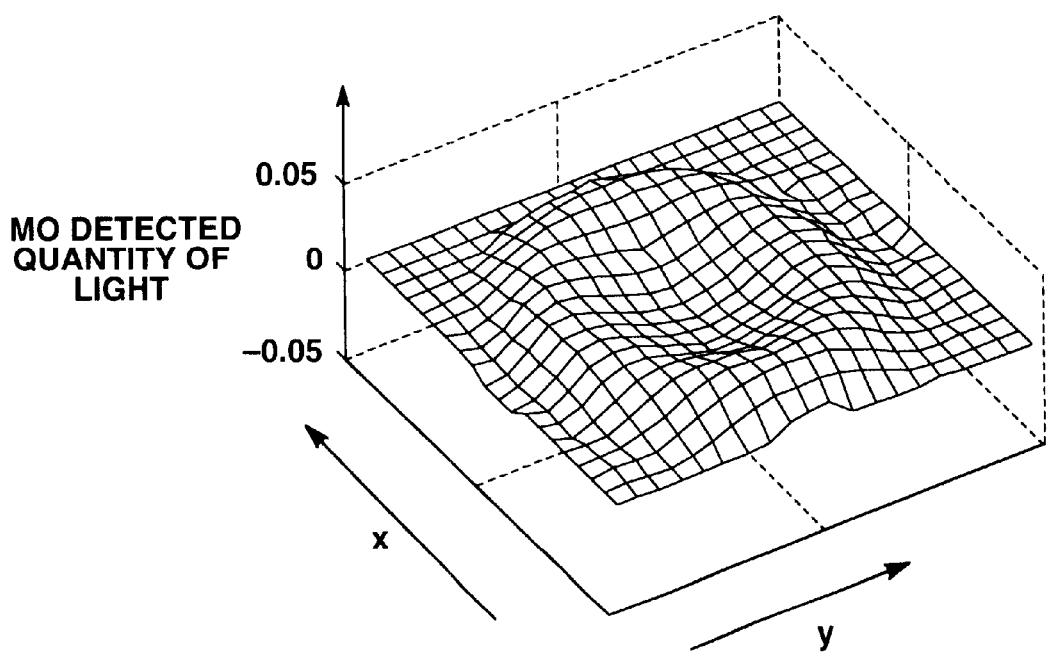
FIG. 20 shows a distribution in the whole return light beam of MO detected quantity of light within the return light beam when the solid immersion lens and multi-layer optical thin film are constructed to meet the requirements specified in FIG. 18.
Figure 21:
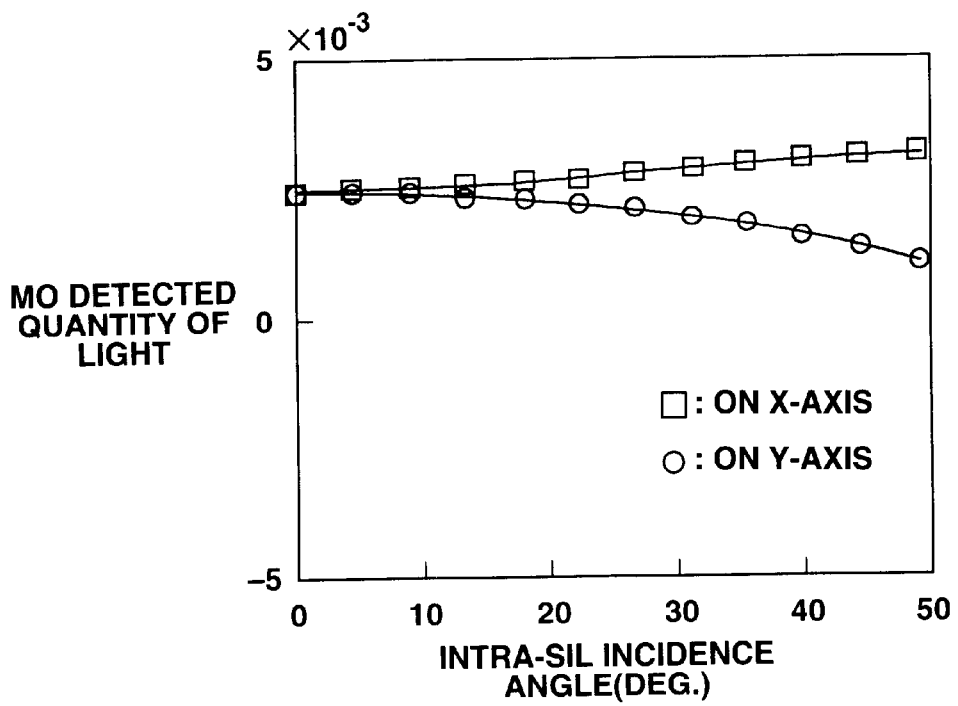
FIG. 21 shows the distribution on x- and y-axes of the MO detected quantity of light within the return light beam when the solid immersion lens and MO multi-layer optical thin film are in contact with each other.
Figure 22:
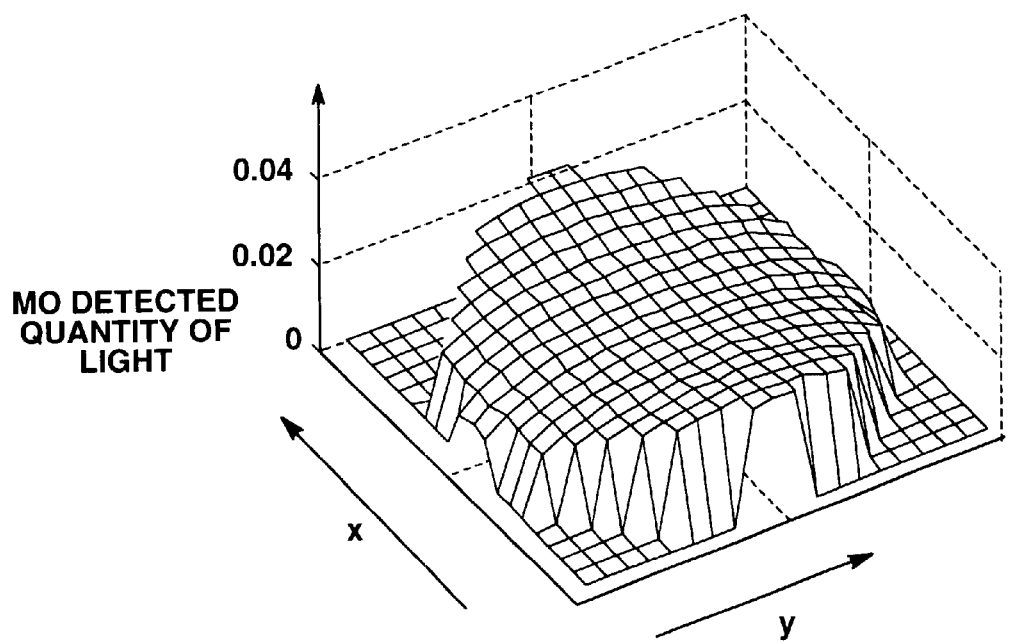
FIG. 22 shows the distribution in the whole return light beam of the MO detected quantity of light within the return light beam when the solid immersion lens and MO multi-layer optical thin film are in contact with each other.

FIG. 19 shows the result of calculation of a distribution on the x- and y-axes in FIG. 11 of MO detected quantity of light within the return light beam when the SIL 1 and multi-layer optical thin film are constructed to meet the requirements specified above and in FIG. 18. FIG. 20 shows the result of calculation of a distribution in the whole return light beam of MO detected quantity of light within the return light beam when the SIL 1 and multi-layer optical thin film are constructed to meet the requirements specified above and in FIG. 18.

Note that in FIG. 19 and FIGS. 21, 23, 24, 25, 31, 32, 35, 41, 42, 43 and 44 which will be referred to later, the horizontal axis indicates an angle at which a light converged inside the SIL 1 is incident upon the multi-layer optical thin film (will be referred as "intra-SIL incidence angle" hereinafter). Namely, a value of 0 deg. along the horizontal axis corresponds to a light on the optical axis of the SIL 1 and a large value along the horizontal axis corresponds to a peripheral light farther from the optical axis. Also note that in these Figures, the marking "□" indicates results of calculation of the distribution along the x-axis in FIG. 11 and "○" indicates results, of calculation of the distribution along the y-axis in FIG. 11.

As will be apparent from FIGS. 19 and 20, the air layer 9 between the SIL 1 and MO multilayer 7 causes the MO detected quantity of light to be distributed with a large unevenness. The MO detected quantity of light is nearly zero at the center of the return light. For comparison with the distribution of MO detected quantity of light shown in FIGS. 19 and 20, FIGS. 21 and 22 show resulted of calculation of the distribution on x- and y-axes of the MO detected quantity of light within the return light beam when the SIL 1 and MO multilayer 7 are in contact with each other (there is not provided the air layer 9). As seen from FIGS. 21 and 22, when the air layer 9 is not provided, the MO detected quantity of light is totally large and distributed generally evenly.

As seen from the comparison between FIGS. 19 and 20 and FIGS. 21 and 22, the air layer 9 between the SIL 1 and MO multilayer 7 cause the MO detected quantity of light to be smaller and distributed with a large unevenness. The existence of the air layer 9 between the SIL 1 and MO multilayer 7 worsens the SNR with which an MO signal is detected from the MO disc 2.

Since the MO detected quantity of light is given by the expression (2-7), MO=Re($r_{ss}^* \cdot r_{sp}$) when $\phi$=0 deg. and MO=Re($r_{pp}^* \cdot r_{ps}$) when $\phi$=90 deg. Thus, the MO detected quantity of light depends on the phase differences $\psi$ of $r_{ss}^* \cdot r_{sp}$ and $r_{pp}^* \cdot r_{ps}$, respectively and is deteriorated depending upon cost. Therefore, when the phase difference $\psi$ between $r_{ss}^* \cdot r_{sp}$ and $r_{pp}^* \cdot r_{ps}$ are larger, the MO detected quantity of light is smaller. If the phase differences $\psi$ of rash $r_{ss}^* \cdot r_{sp}$ and $r_{pp}^* \cdot r_{ps}$, respectively, changes largely depending upon the intra-SIL incidence angle, the distribution of the MO detected quantity of light becomes uneven.

When $\phi$=0 deg., the phase difference of $r_{ss}^* \cdot r_{sp}$ is a phase difference on the x-axis. So, this phase difference of $r_{ss}^* \cdot r_{sp}$ will be referred to as "$\psi_x$" hereinafter. Also, when $\psi$=90 deg., the phase difference of $r_{pp}^* \cdot r_{ps}$ is a phase difference on the y-axis. So this phase difference of $r_{pp}^* \cdot r_{ps}$ will be referred to as "$\psi_y$" hereinafter.

Figure 23:
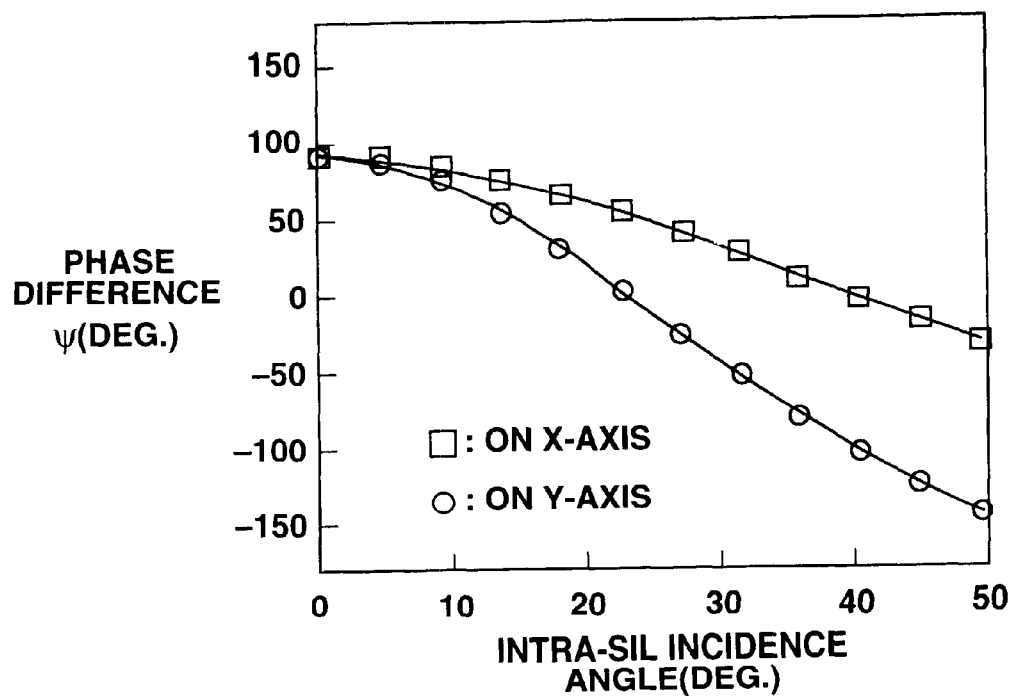
FIG. 23 shows the distribution on the x- and y-axes of a phase difference within the return light beam when the solid immersion lens and multi-layer optical thin film are constructed to meet the requirements specified in FIG. 18.

FIG. 23 shows a relation between the phase differences $\psi_x$ and $\psi_y$ and intra-SIL incidence angle, calculated under the conditions shown in FIG. 18. As shown in FIG. 23, the phase differences $\psi_x$ and $\psi_y$ vary greatly depending upon the intra-SIL incidence angle. The unevenness of the MO detected quantity of light is caused by the fact that the phase differences $\psi_x$ and $\psi_y$ vary greatly depending upon the intra-SIL incidence angle. Therefore, by compensating the phase differences $\psi_x$ and $\psi_y$ so as not to vary greatly, it is possible to reduce the unevenness of the distribution of the MO detected quantity of light.

Figure 24:
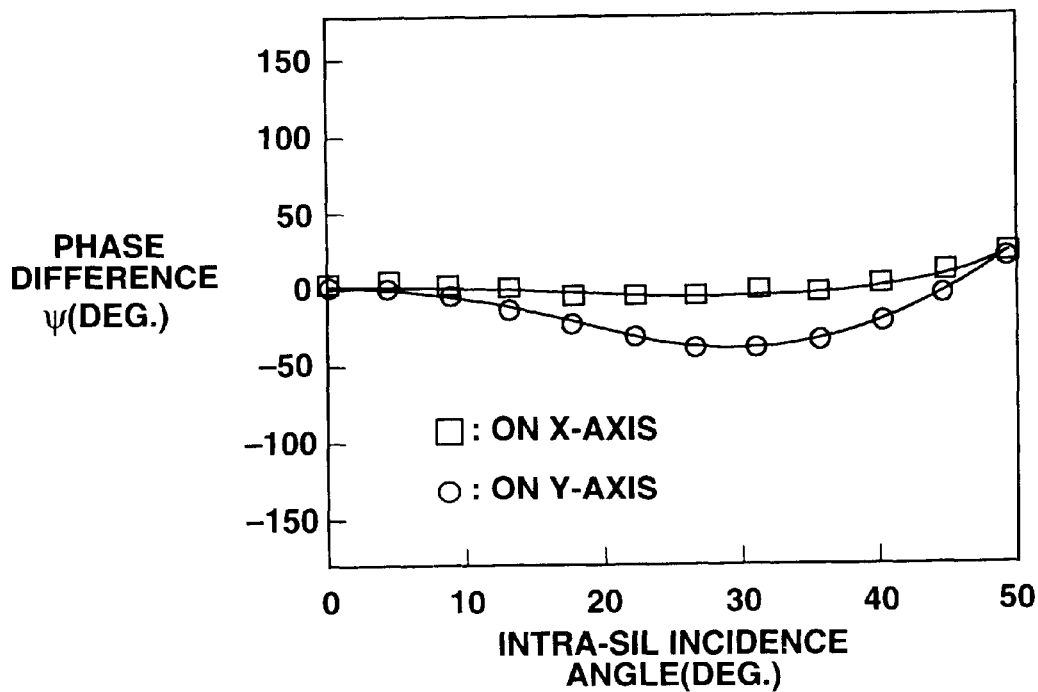
FIG. 24 shows an example of compensation of the phase difference shown in FIG. 23 using a quadric.
Figure 25:
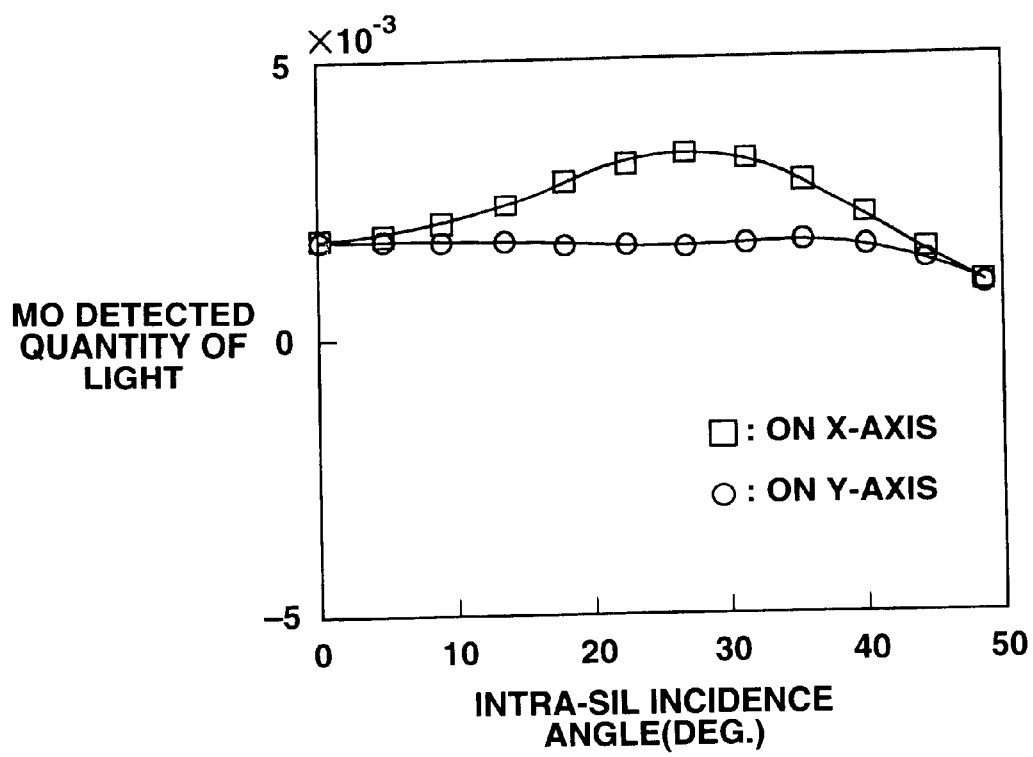
FIG. 25 shows the distribution on the x- and y-axes of the MO detected quantity of light within the return light beam when the phase differences have been compensated as in FIG. 24.
Figure 26:
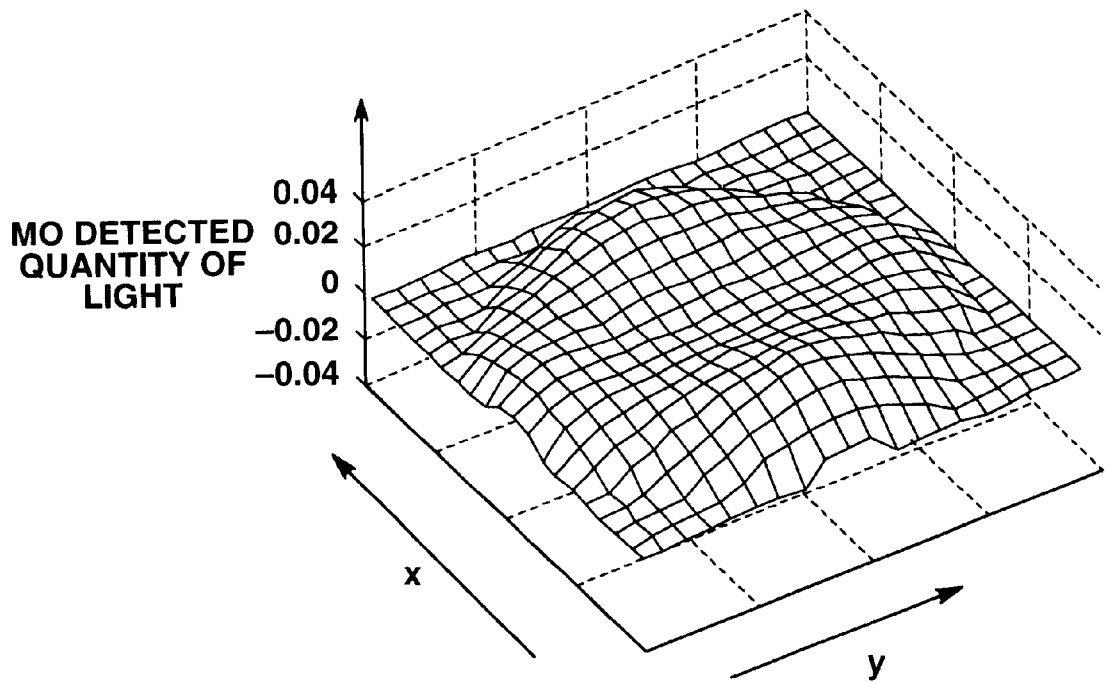
FIG. 26 shows the distribution in the whole return light beam of the MO detected quantity of light within the return light beam when the phase differences have been compensated as in FIG. 24.

FIG. 24 shows an example of compensation of the phase differences $\psi_x$ and $\psi_y$ having been compensated a quadric. FIG. 25 shows the result of calculation of the distribution on the x- and y-axes in FIG. 11 of the MO detected quantity of light within the return light beam when the phase differences have been compensated as in FIG. 24. FIG. 26 shows the result of calculation of the distribution in the whole return light beam of the MO detected quantity of light within the return light beam when the phase differences have been compensated as in FIG. 24.

As will be seen from FIGS. 24 to 26, compensation of the phase differences $\psi_x$ and $\psi_y$ to be nearly constant irrespectively of an intra-SIL incidence angle permits to increase the MO detected quantity of light and reduce the unevenness of the distribution of the MO detected quantity of light.

To implement the above compensation, an optically anisotropic optical element is disposed in the optical path of the optical head according to the present invention. The optical head in which the above-mentioned compensation is enabled by the optical element disposed in the optical path according to the present invention will further be described below. Note that the optically anisotropic optical element may be an optical crystal plate.

Figure 27:
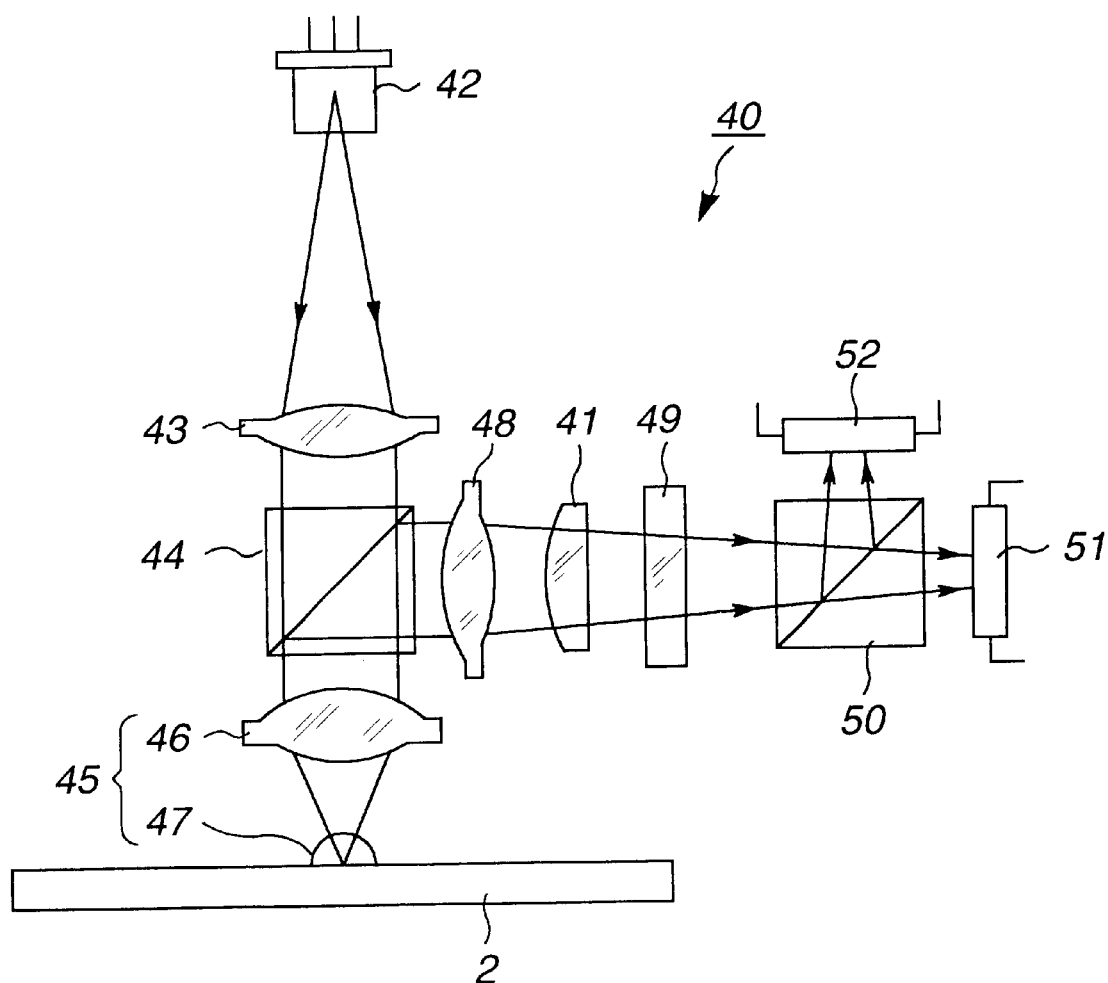
FIG. 27 shows the construction of an embodiment of optical head according to the present invention.

Referring now to FIG. 27, there is schematically illustrated an embodiment of optical head according to the present invention. Note that the optical system for focusing servo and tracking servo is not shown in FIG. 27 for the simplicity of illustration and explanation of the optical head. The optical head is generally indicated with a reference 40.

The optical head 40 is constructed similarly to the optical head 20 shown in FIG. 9 except that an optically anisotropic optical element 41 is disposed in the optical, path of the optical head 40 in order to implement the aforementioned compensation. For reading a signal recorded in the MO disc 2 with the aid of the optical head 40, a linearly polarized laser light is emitted from a laser source 42, and guided through a first collimator lens 43 and beam splitter 44 to be incident upon an objective 45. The objective 45 consists of a first lens 46 to converge the laser light transmitted through the beam splitter 44, and a solid immersion lens (will also be referred to as "SIL" hereinafter) 47 disposed to be opposite to the MO disc 2. Thus, the incident laser light upon the objective 45 is converged by the first lens 46, and then incident upon the SIL 47 by which the incident laser light is focused on, or in the proximity of, the end face of the SIL 47.

The incident laser light focused on, or in the proximity of, the end face of the SIL 47 is reflected by a multi-layer optical thin film. More specifically, the majority of the incident laser beam is totally reflected by the end face of the SIL 47, and al part of the incident laser light reaches the MO multilayer 7 of the MO disc 2 as an-evanescent light leaking from the end face of the SIL 47. The part of the incident laser light is reflected by the MO multilayer 7.

The light returned, by reflection, from the multi-layer optical thin film is changed in polarization state depending upon the magnetized direction of the magnetic layer 5 forming the MO multilayer 7 under the polar Kerr effect of the magnetic layer 5. The return light is guided by the SIL 47 and first lens 46 to be incident upon the beam splitter 44, and then reflected by the beam splitter 44. Thus, the return light is taken out.

The return light reflected by the beam splitter 44 and taken out is converged by a second collimator lens 48, and guided through the optical element 41 and a half-wave plate 49 to be incident upon a polarizing beam splitter 50 which will split the return light into two polarized components whose polarized directions are orthogonal to each other.

Of the polarized components split by the polarizing beam splitter 50, the one having been transmitted by the beam splitter 50 is detected by a first photodetector 51, whereas the other having been reflected by the beam splitter 50 is detected by a second photodetector 52. A magneto-optical signal (will be referred to as "MO signal" hereinafter) indicative of a magnetized direction of the magnetic layer 5 is detected as a difference ($|I|^2-|J|^2$) between an intensity of the polarized light component detected by the first photodetector 51 and an intensity of the polarized light component detected by the second photodetector 52.

Figure 28:
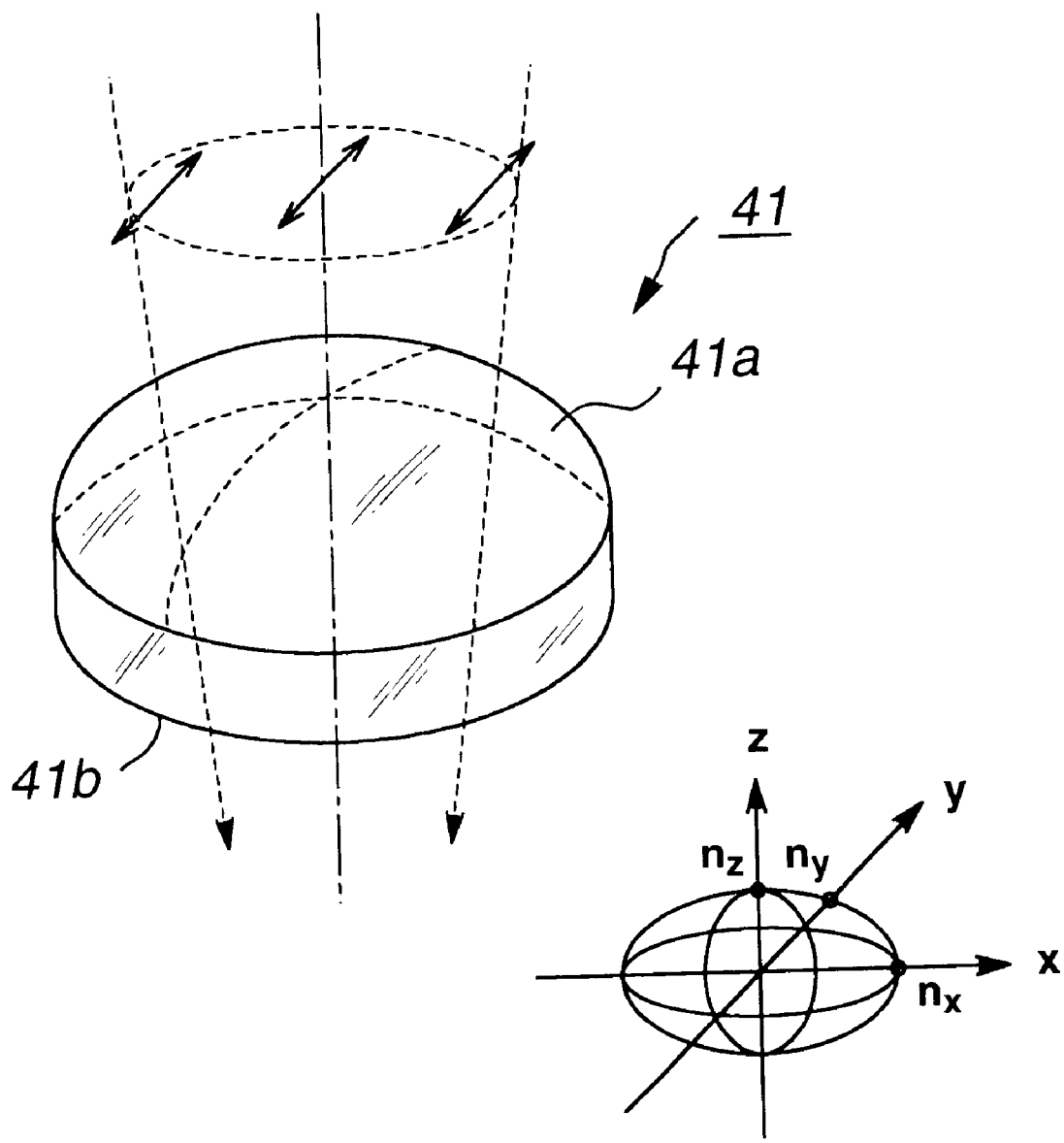
FIG. 28 shows an example of optically anisotropic optical element used in the optical head shown in FIG. 27.

In the optical head 40, the aforementioned compensation is done by the optically anisotropic optical element 41 disposed in the optical path for the return light. FIG. 28 shows the optically anisotropic optical element 41 used as an example in the optical head 40 shown in FIG. 27. As shown, the optical element 41 has a spherical surface 41a upon which a light is incident and a flat surface 41b from which the incident light goes out. The optical element 41 is sufficiently thick as compared with the wavelength $\lambda$ of the return light incident upon the optical element 41 so that there will take place no interference due to a multiple reflection within the optical element 41.

The x-, y- and z-axes are defined as in FIG. 28. The x- and y-axes correspond to the x- and y-axes in FIG. 11. The z-axis corresponds to the optical axis of the return light. Also it is assumed that the x-axial refractive index of the optical element 41 is $n_x$, the y-axial refractive index is $n_y$, and the z-axial refractive index is $n_z$. The optical element 41 is of a mono-axial type, and it is disposed in the optical path of the return light in such a manner that $n_x$ is not equal to $n_y$ and any of $n_x$ and $n_y$ equals to $n_z$. The return light incident upon the optical element 41 will be transmitted as a light beam along the z-axis through the optical element 41.

Actions taking place when the return light passes through the optical element 41 will be described below. First, there will be described an action arisen due to the fact that the return light incident upon the optical element 41 is a converged one, and then there will be described an action taking place due to the fact that the light-incident surface 41a of the optical element 41 is formed spheric. In the following description, it is assumed that the wavelength of an incident light upon the optical element 41 is $\lambda$ and the central thickness of the optical element 41 is t. The optical element 41 is disposed in the optical path of the return light so that $n_y=n_z$.

First, the action arisen due to the fact that the return light incident upon the optical element 41 is convergent, will be described. Note that although the return light is incident as a convergent light upon the optical element 41, it may be incident as a divergent light upon the optical element 41. Also in the latter case, a similar action will of course take place.

Figure 29:
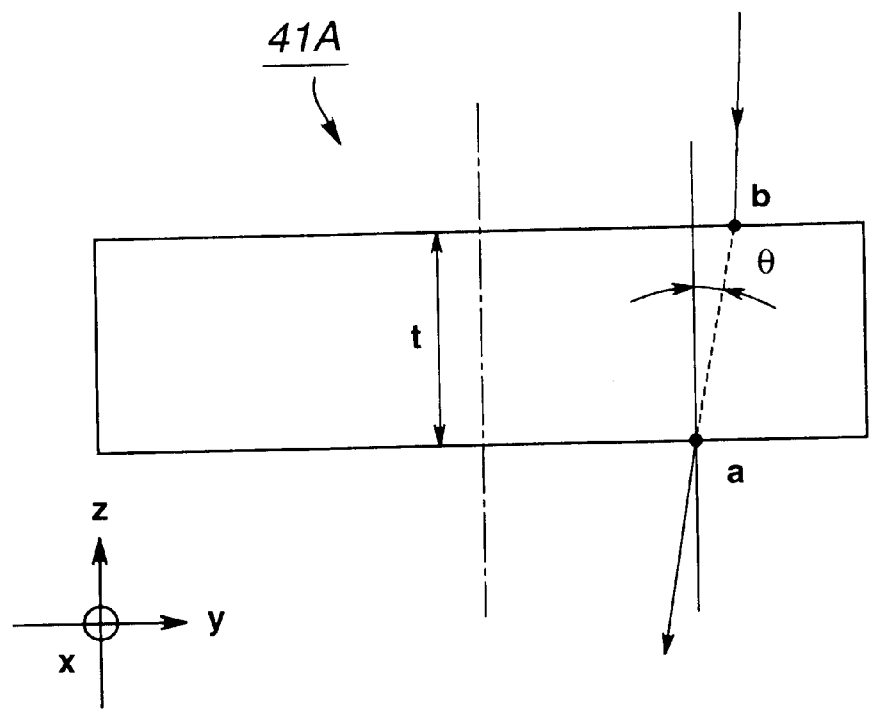
FIG. 29 explains a phase difference imparted to a light passing obliquely through the optically anisotropic optical element of a parallel plate.
Figure 30:
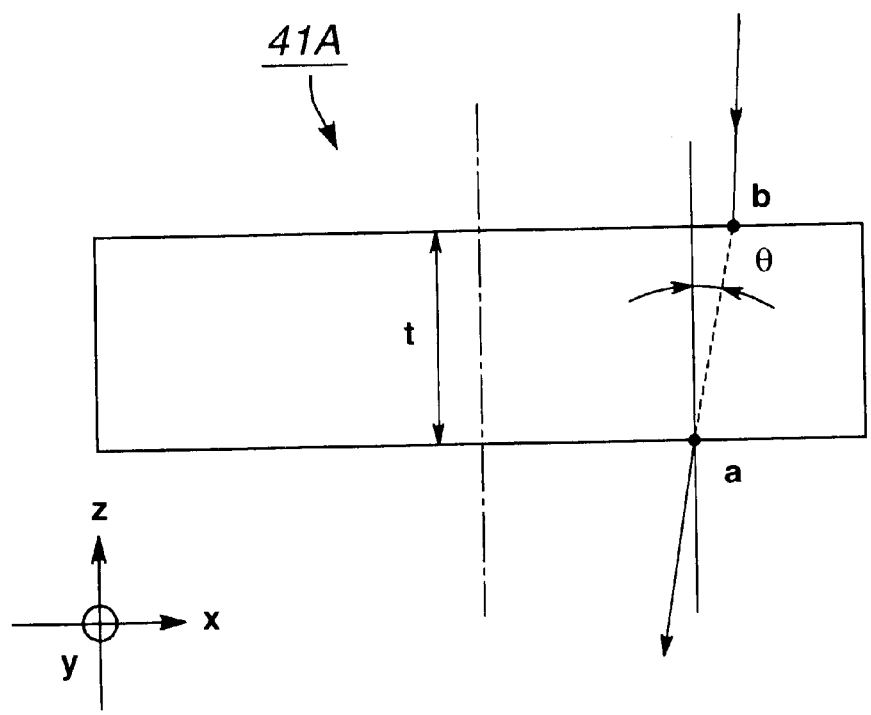
FIG. 30 also explains a phase difference imparted to a light passing obliquely through the optically anisotropic optical element of a parallel plate.

FIGS. 29 and 30 show an optical element 41 A made of a parallel, flat optical crystal plate. A phase difference to which the light passing obliquely through the optical element 41A is subject will be considered. As the light travels inside the optical element 41A, it will be polarized in two inherent directions and refracted with two inherent indexes. When the light passes through the optical element 41A at an angle $\theta$ formed in the z-y plane with respect to the z-axis as shown in FIG. 29, the two inherent directions of polarization will be the x- and y-axial directions. The y-axial inherent refractive index is $n_y$ ($=n_z$) while the x-axial inherent refractive index Ne is given by a following expression (2-8).

$$n_z = \frac{1}{\sqrt{\frac{\cos^2\theta}{n_x^2} + \frac{\sin^2\theta}{n_y^2}}} \quad (2\text{-}8)$$

Therefore, when the light passes through the optical element 41A at an angle $\theta$ in the z-y plane with respect to the z-axis as shown in FIG. 29, there will take place a phase difference $\psi_y$ as given by a following expression (2-9) between the x-axial polarized light and y-axis polarized light.

$$\varphi_y = \frac{2\pi}{\lambda} \cdot \frac{t}{\cos\theta} \cdot (n_e - n_y) \quad (2\text{-}9)$$

On the other hand, when the light passes through the optical element 41A at an angle $\theta$ in the z-x plane with respect to the z-axis as shown in FIG. 30, the two inherent directions of polarization are x- and y-axial directions. The y-axial inherent refractive index is $n_y$ and x-axial inherent refractive index is $n_x$.

Therefore, when the light passes through the optical element 41A at an angle $\theta$ in the z-x plane with respect to the z-axis as shown in FIG. 30, there will take place a phase difference $\psi_x$ given by an following expression (2-10) between the x-axial polarized light and y-axial polarized light.

$$\varphi_x = \frac{2\pi}{\lambda} \cdot \frac{t}{\cos\theta} \cdot (n_x - n_y) \qquad (2\text{-}10)$$

If the angle $\theta$ is sufficiently small, the phase difference $\psi_y$ can be approximate to a following expression (2-11) while the phase difference $\psi_x$ can be approximate to a following expression (2-12). Note that in the expressions (2-11) and (2-12), $n_x - n_y = \Delta n$.

$$\varphi_y = \frac{2\pi}{\lambda} \cdot t \cdot \Delta n \cdot \left(1 - \frac{\sin^2\theta}{2}\right) \qquad (2\text{-}11)$$

$$\varphi_x = \frac{2\pi}{\lambda} \cdot t \cdot \Delta n \cdot \left(1 + \frac{\sin^2\theta}{2}\right) \qquad (2\text{-}12)$$

Figure 31:
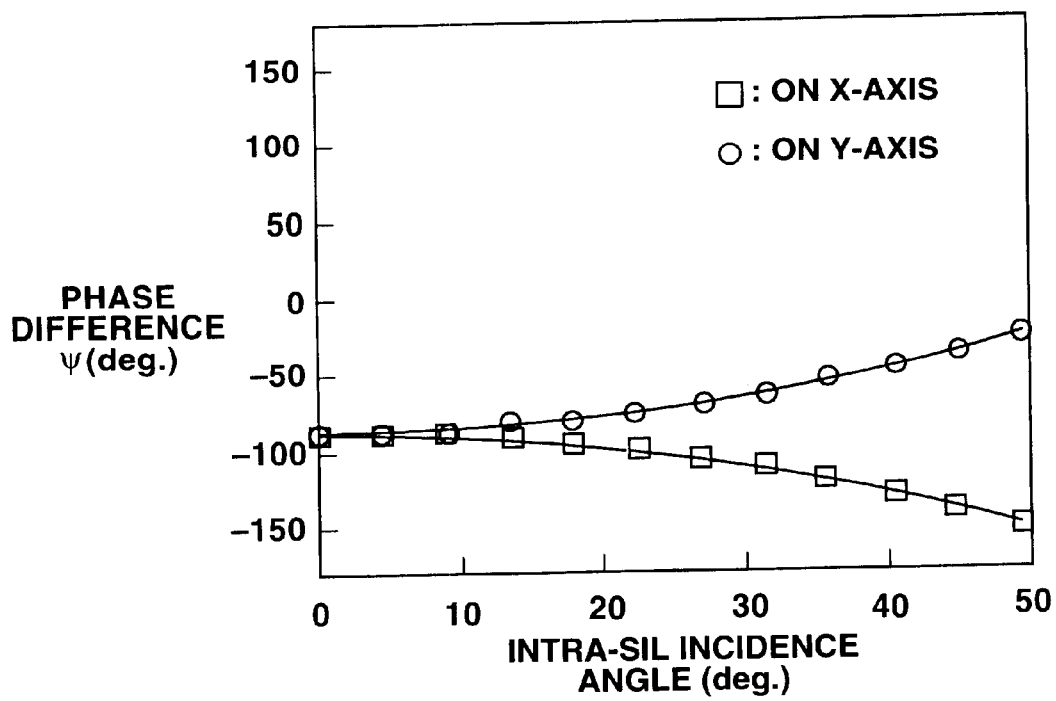
FIG. 31 shows a distribution on the x- and y-axes of a phase difference imparted to a light passing through the optically anisotropic optical element of the parallel plate.

Referring now to FIG. 31, there is illustrated by way of example the result of calculation of a distribution on the x- and y-axes of a phase difference imparted to a light passing through the optical element when it is assumed for example that the maximum angle $\theta$ when the light passes through the optical element 41A is $\theta_{max}$=14.5 deg., t=332 μm, λ=633 nm and $\Delta n$=−0.01. Note that the intra-SIL incidence angle indicated along the horizontal axis in FIG. 31 is proportional to the angle $\theta$ and the maximum angle $\theta_{max}$ of 14.5 deg. is attained when the intra-SIL incidence angle is about 50 deg.

Figure 32:
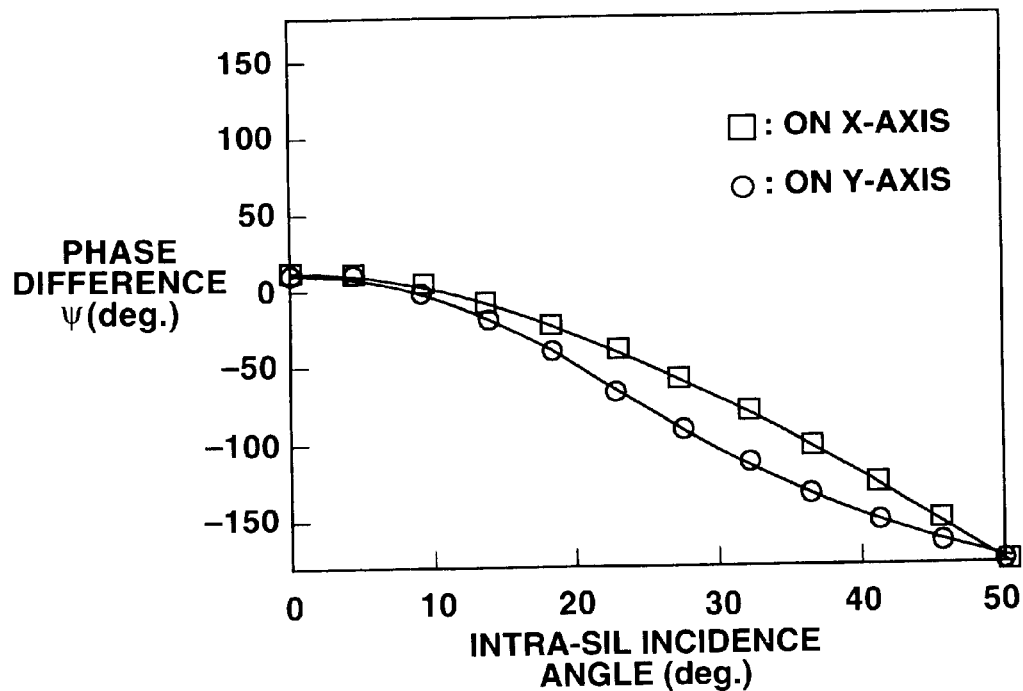
FIG. 32 shows a distribution on the x- and y-axes of a resultant phase difference of a return light having already imparted thereto the phase difference as shown in FIG. 23 and passing through the optically anisotropic optical element and having thus imparted thereto the phase difference as shown in FIG. 31.

When passing through the optical element 41A, the return light will be subject to the phase differences as shown in FIG. 31. Therefore, the phase differences $\psi_x$ and $\psi_y$ as shown in FIG. 23 of the return light will be changed as shown in FIG. 32.

Further, in the optical element 41 used in the optical head 40, the return light is subjected to the action arisen due to the fact that the incident light upon the optical element 41 is a convergent one, and also to the other action due to the fact that the light-incident surface 41a of the optical element 41 is spheric. There will be considered hereinbelow phase differences to which the light passing obliquely through the optical element 41 of which the light-incident surface 41a is spheric is subjected as shown in FIGS. 33 and 34.

Figure 33:
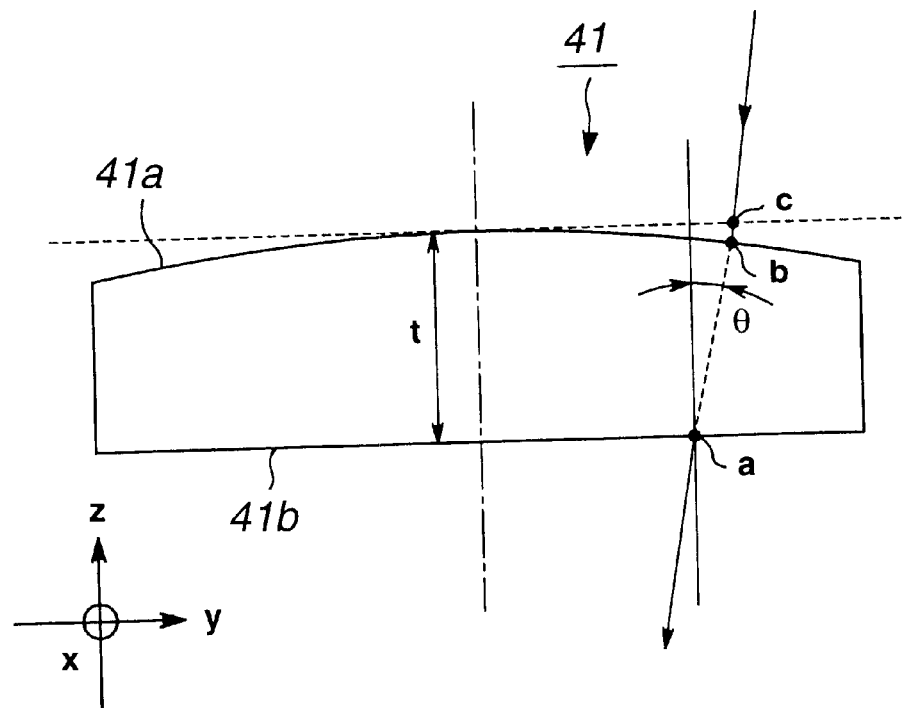
FIG. 33 explains a phase difference imparted to a light passing obliquely through an optically anisotropic optical element whose light-incident surface is formed spheric.
Figure 34:
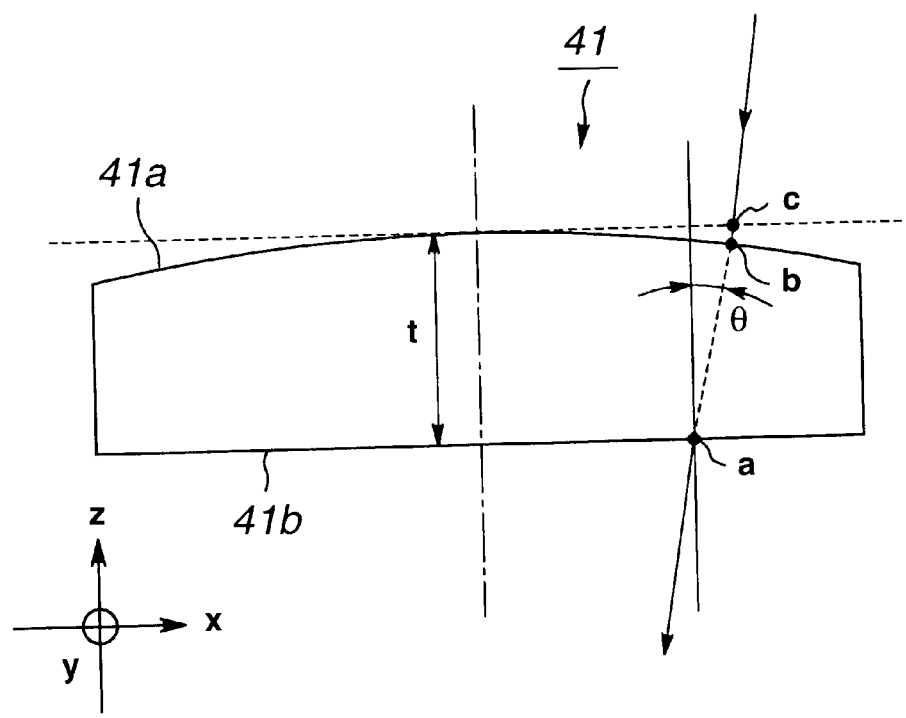
FIG. 34 also explains a phase difference imparted to a light passing obliquely through an optically anisotropic optical element whose light-incident surface is formed spheric.

When the radius of curvature of the spheric light-incident surface 41a is large, the distance $d_{b,c}$ between the points b and c shown in FIGS. 33 and 34 is nearly proportional to $\sin^2\theta$. Therefore, the distance $d_{b,c}$ between the points b and c can be given by a following expression (2-13).

$$d_{b,c} = d \cdot \sin^2\theta \qquad (2\text{-}13)$$

where d is a factor.

The phase differences to which the light passing obliquely through the optical element 41 can be expressed using the above-mentioned factor d. That is, the phase difference $\psi_y$ given by the expression (2-11) and arisen when the light passes through the optical element 41 at an angle $\theta$ in the z-y plane with respect to the z-axis as shown in FIG. 33, will be subject to an action taking place due to the fact that the light-incident surface 41a of the optical element 41 is formed spheric, and it is given by a following expression (2-14).

$$\varphi_y = \frac{2\pi}{\lambda} \cdot t \cdot \Delta n \cdot \left(1 - \left(\frac{d}{t} + \frac{1}{2}\right) \cdot \sin^2\theta\right) \qquad (2\text{-}14)$$

Also, the phase difference $\psi_x$ given by the expression (2-12) and arisen when the light passes through the optical element 41 at an angle $\theta$ in the z-x plane with respect to the z-axis as shown in FIG. 34, will be subject to an action taking place due to the fact that the light-incident surface 41a of the optical element 41 is formed spheric, and it is given by a following expression (2-15).

$$\varphi_x = \frac{2\pi}{\lambda} \cdot t \cdot \Delta n \cdot \left(1 - \left(\frac{d}{t} - \frac{1}{2}\right) \cdot \sin^2\theta\right) \qquad (2\text{-}15)$$

Figure 35:
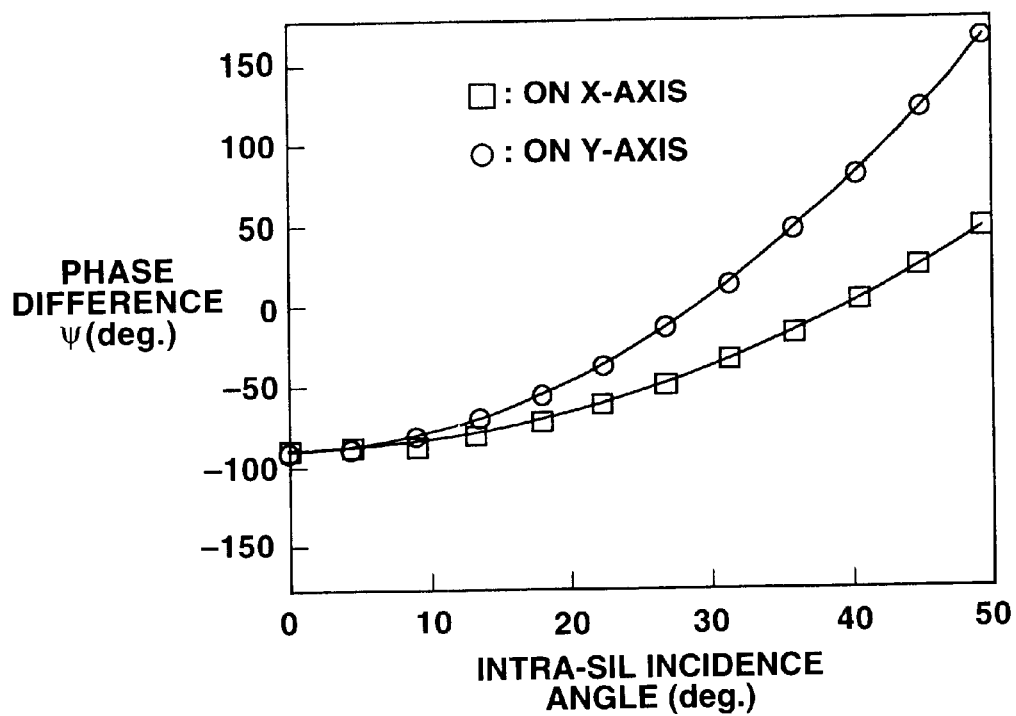
FIG. 35 shows a distribution on the x- and y-axes of a phase difference imparted to a light passing through an optically anisotropic optical element whose light-incident surface is formed spheric.

Referring now to FIG. 35, there is illustrated by way of example the result of calculation of a distribution on the x- and y-axes of a phase difference imparted to a light passing through the optical element when it is assumed for example that the maximum angle $\theta$ when the light passes through the optical element 41 is $\theta_{max}$=14.5 deg., t=332 μm, λ=633 nm, $\Delta n$=−0.01 and d=5.61 μm. Note that the intra-SIL incidence angle indicated along the horizontal axis in FIG. 35 is proportional to the angle $\theta$ and the maximum angle $\theta_{max}$ of 14.5 deg. is attained when the intra-SIL incidence angle is about 50 deg.

When passing through the optical element 41, the return light will be subject to the phase differences as shown in FIG. 35. Therefore, the phase differences $\psi_x$ and $\psi_y$ as shown in FIG. 23 of the return light will be similar to those shown in FIG. 24. Thus, the disposition of the optical element 41 in the optical path of the return light permits to reduce the phase differences $\psi_x$ and $\psi_y$ of the entire return light nearly to zero.

Since the phase differences $\psi_x$ and $\psi_y$ of the entire return light are thus nearly to zero, the MO detected quantity of light has a high level as in FIGS. 25 and 26 and is evenly distributed. That is, even if the air layer is provided between the SIL 47 and MO multilayer 7 of the MO disc 2, the optical head 40 will assure an MO detected quantity of light equal to that when no air layer is provided, owing to the optical element 41.

As having been described in the foregoing, owing to the optical element 41 in the optical path of the return light, the optical head 40 according to the present invention can assure a high quality and better SNR (signal-to-noise ratio) of an MO signal detected from the MO disc 2 even with the air layer existing between the SIL 47 and MO multilayer 7 of the MO disc 2.

According to the present invention, the dependency upon the Intra-SIL incidence angle of the phase differences arisen in the return light is compensated by the optically anisotropic optical element to improve the quality of detected signal. However, the optimum specification of the optical element vary is not limited to the aforementioned example, but varies depending upon the construction of the multi-layer optical thin film.

That is, both the light-incident surface and light-outgoing surface of the optically anisotropic optical element may be formed spheric or aspheric, or one of them may be formed aspheric. The non-flat surface of the optical element may be convex or concave. Furthermore, the non-flat surface may be rotation-symmetrically or -asymmetrically curved with respect to the optical axis. That is, the surfaces of the optical element may be formed freely as desired so long as they are formed to compensate the phase differences arisen in the return light.

Figure 36:
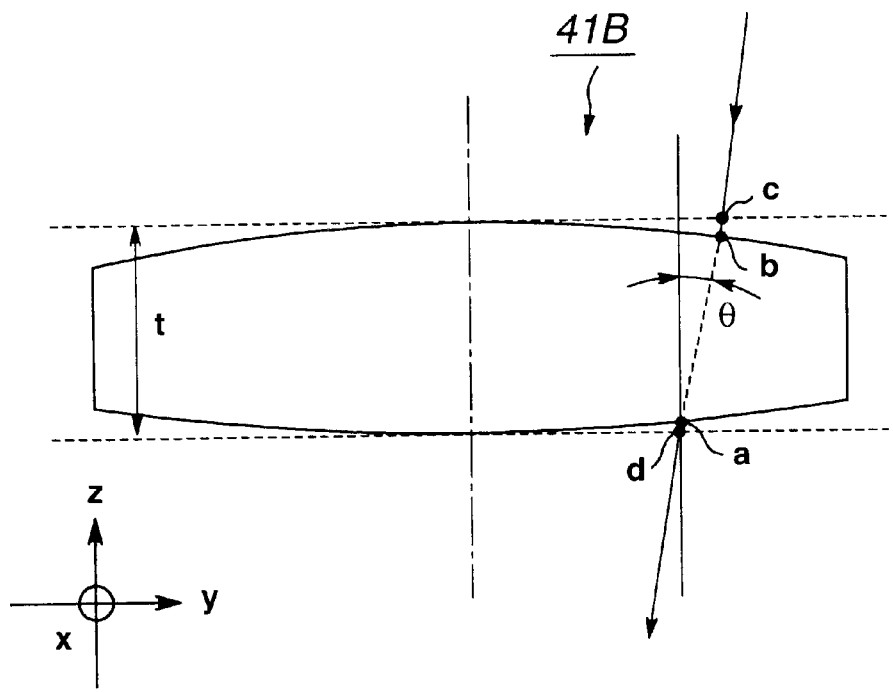
FIG. 36 shows an example of optically anisotropic optical element of which both the light-incident surface and light-outgoing surface are formed spheric.

Referring now to FIG. 36, there is illustrated an example of optically anisotropic optical element of which both the light-incident surface and light-outgoing surface are formed spheric. The optical element is generally indicated with a reference 41B. As shown, if an angle θ at which a light passes through the optical element 41B is sufficiently small when the light is incident upon a point b and goes out at a point a, a distance between the points b and a can be approximate to a quotient resulted by subtracting from a central thickness t of the optical element 41B a distance between the points b and c and a distance between the point a and a point d as shown in FIG. 36.

Figure 37:
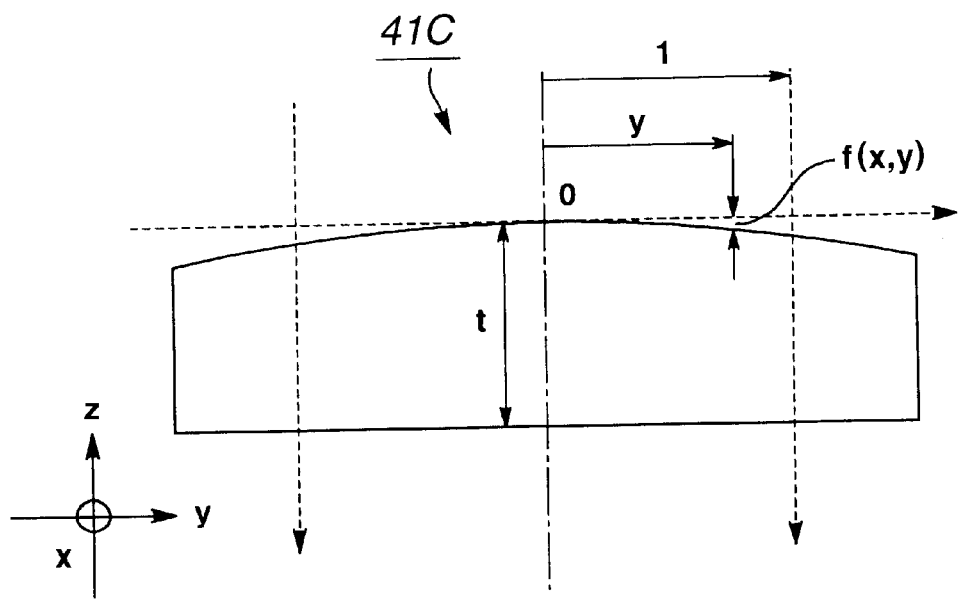
FIG. 37 shows an example of optically anisotropic optical element whose light-incident surface is formed aspheric.

Also, FIG. 37 shows an example of optically anisotropic optical element whose light-incident surface is formed aspheric. The optical element is generally indicated with a reference 41C. The optical element 41C has a light-incident surface formed aspheric. The surface shape is given as a function f (x, y) in a following expression (2-16) when the x-, y- and z-axes are defined as in FIG. 37.

$$f(x, y)=52.22x^2+66.27x^4-64.88x^6-83.37y^2+155.6y^4-68.55y^6 \quad (2\text{-}16)$$

where each factor is in μm.

Figure 38:
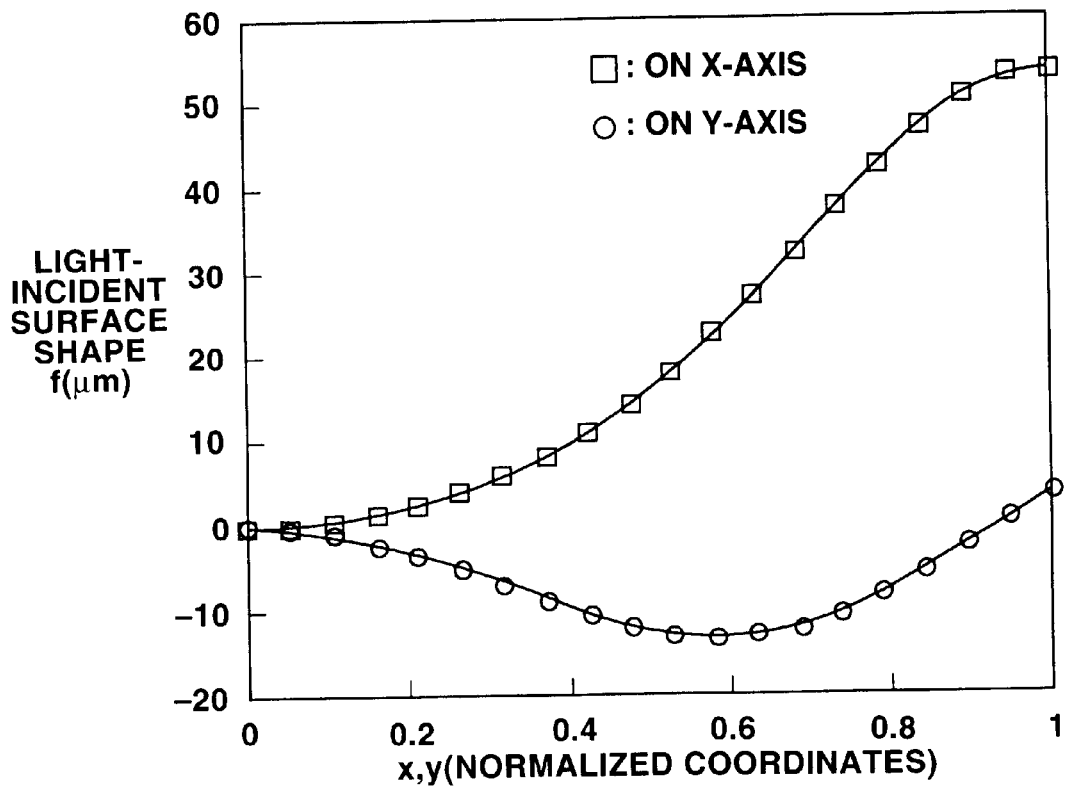
FIG. 38 shows curves formed by plotting, along x- and y-axes, respectively, the shape of the light-incident surface of the optically anisotropic optical element shown in FIG. 37.

FIG. 38 shows curves formed by plotting, along the x- and y-axes, respectively, the shape of the light-incident surface of the optically anisotropic optical element 41C shown in FIG. 37. The coordinate system in FIG. 38 is normalized so that the center of the light-incident surface of the optical element 41C, lies at (x, y, z)=(0, 0, 0) and both x and y will be one at the end of the incident light beam upon the light-incident surface of the optical element 41C.

Figure 39:
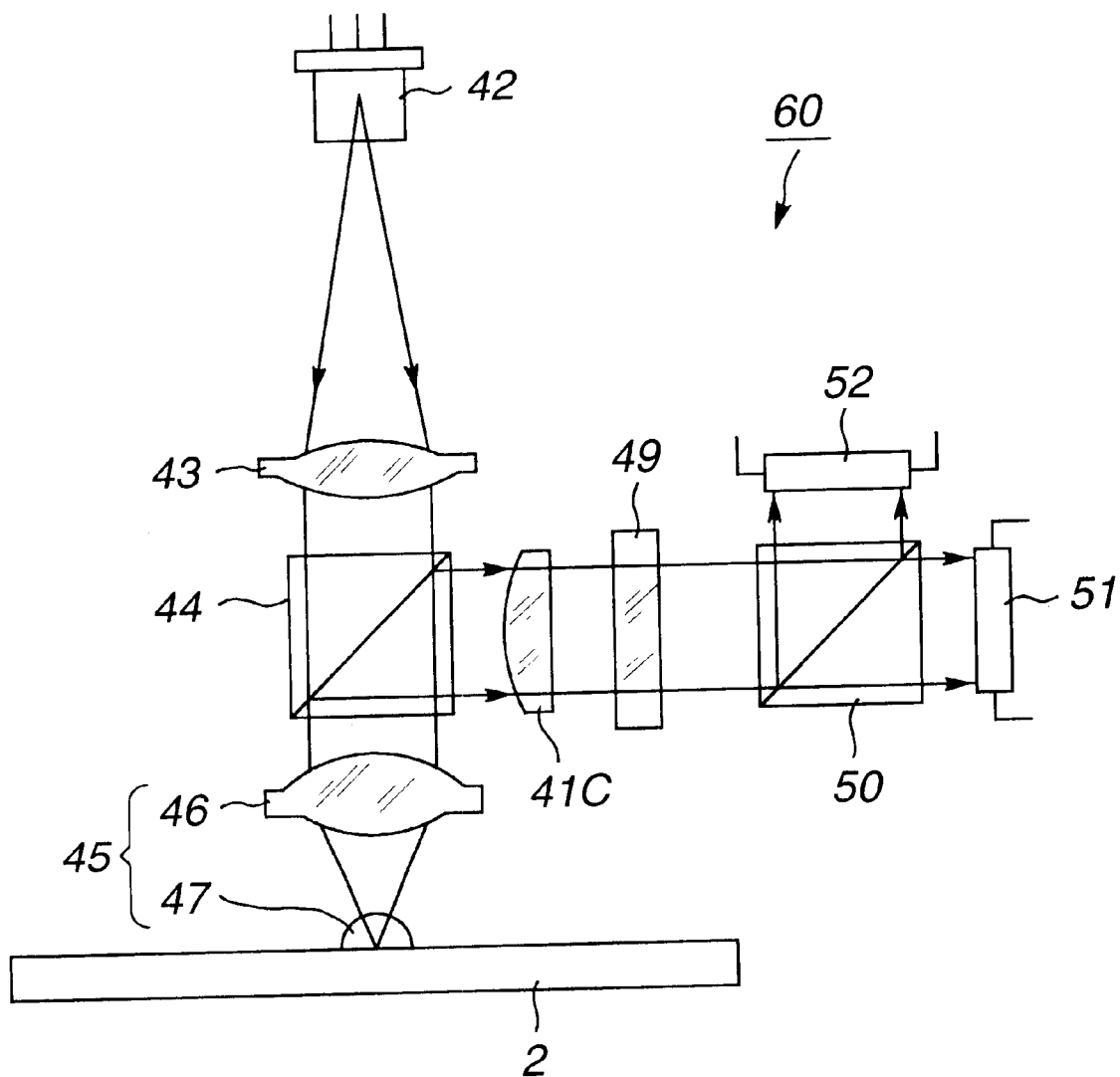
FIG. 39 shows the construction of another embodiment of optical head according to the present invention.

FIG. 39 shows the construction of another embodiment of optical head using the optical element 41C according to the present invention. Note that the same elements of the optical head 40 in FIG. 27 are indicated with the same reference numerals as those in FIG. 27. In FIG. 39, the optical head is generally indicated with a reference 60.

As in FIG. 39, the optical head 60 is constructed similarly to the optical head 40 shown in FIG. 27 except that the second collimator lens 48 is not provided and the optical element 41C has an aspheric light-incident surface. Since the second collimator lens 48 is omitted in this optical head 60, the return light reflected by the beam splitter 44 and taken out is incident as a parallel light upon the optical element 41C.

Figure 40:
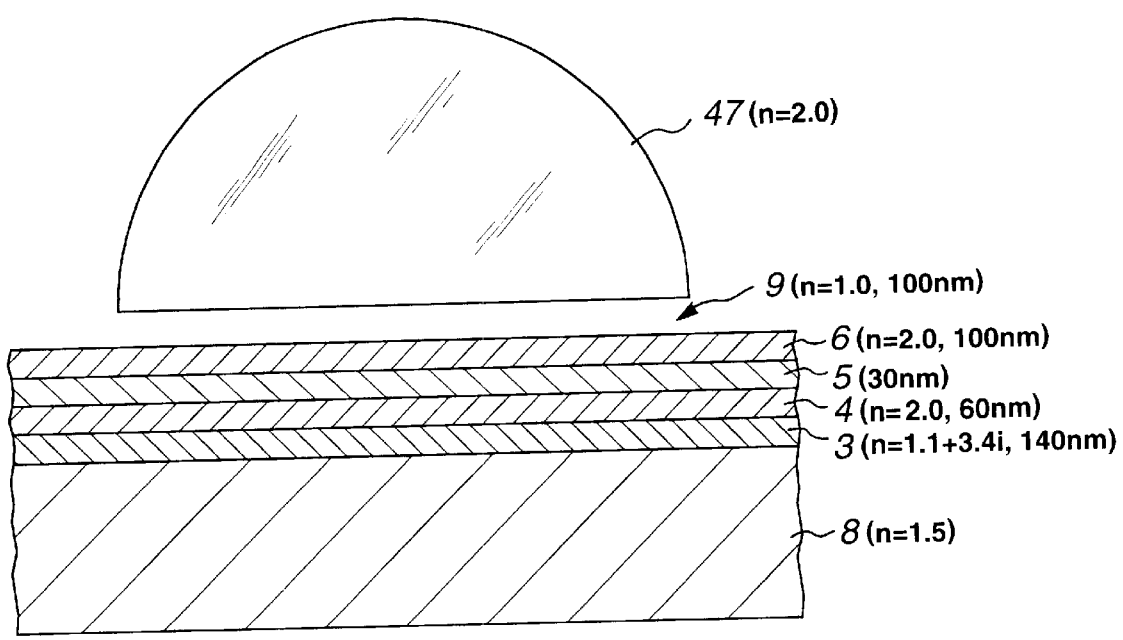
FIG. 40 shows, by way of example, required specifications of the solid immersion lens and multi-layer optical thin film.

FIG. 40 shows, by way of example, required specifications of the solid immersion lens (SIL) 47 and multi-layer optical thin film. As specified in FIG. 40, the SIL 47 has a refractive index of n=2.0. The air layer 9 between the SIL 47 and MO multilayer 7 is 100 nm thick, and the second dielectric layer 6 is formed from SiN having a refractive index of n=2.0 and a thickness of 100 nm. The magnetic layer 5 is 30 nm thick and has dielectric tensor components of $\epsilon_{xx}$=32−4.063+15.44i and $\epsilon_{xy}$=0.2337−0.08722i. The first dielectric layer 4 is formed from SiN having a refractive index of n=2.0 and a thickness of 60 nm. The light-reflective layer 3 is formed from Al having a complex index of refraction of n=1.1+3.4i and a thickness of 140 nm. The substrate 8 has a refractive index of n=1.5 and a sufficiently large thickness as compared with the wavelength of the light. Also, in the optical element 41C, the central thickness is t=323 μm, λ=633 nm and Δn=0.01.

Figure 41:
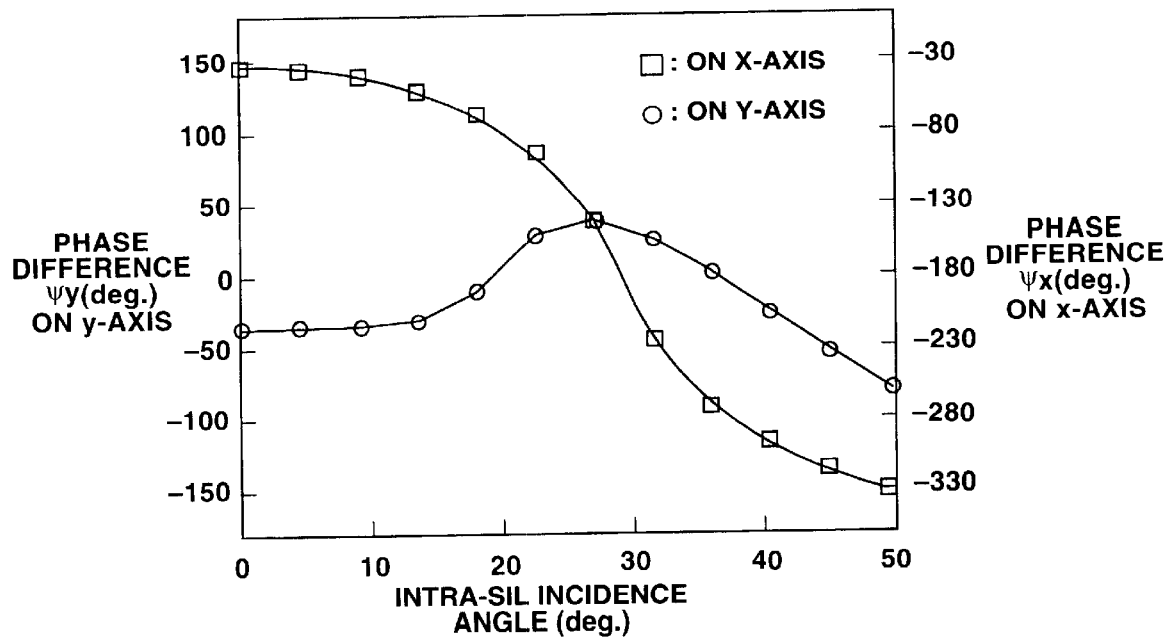
FIG. 41 shows a distribution on the x- and y-axes of a phase difference within the return light beam when the solid immersion lens and multi-layer optical thin film are constructed to meet the requirements specified in FIG. 40 but no optically anisotropic optical element is used.
Figure 42:
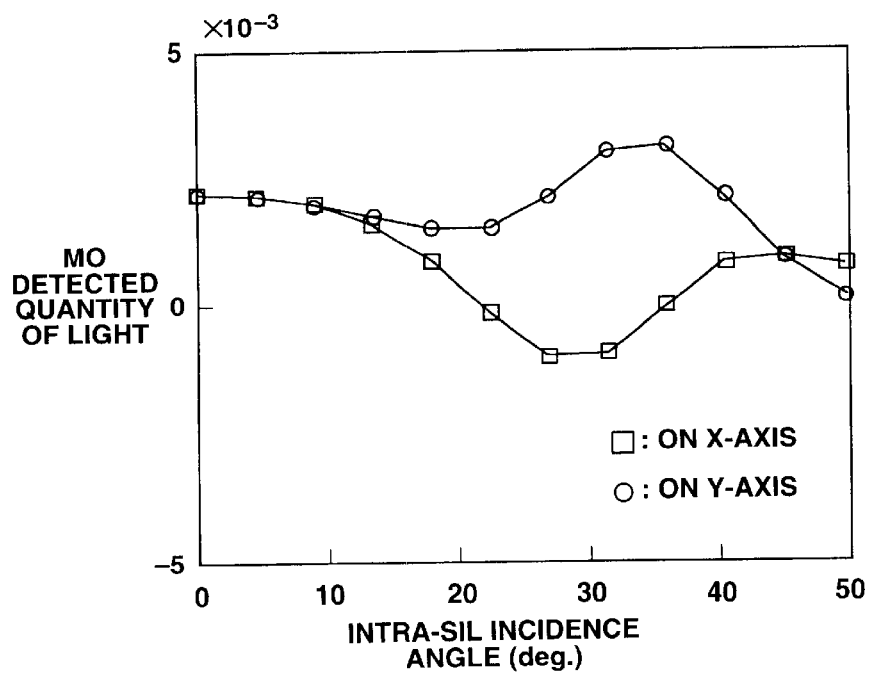
FIG. 42 shows a distribution on the x- and y-axes of an MO detected quantity of light within the return light beam when the solid immersion lens and multi-layer optical thin film are constructed to meet the requirements specified in FIG. 40 but no optically anisotropic optical element is used.
Figure 43:
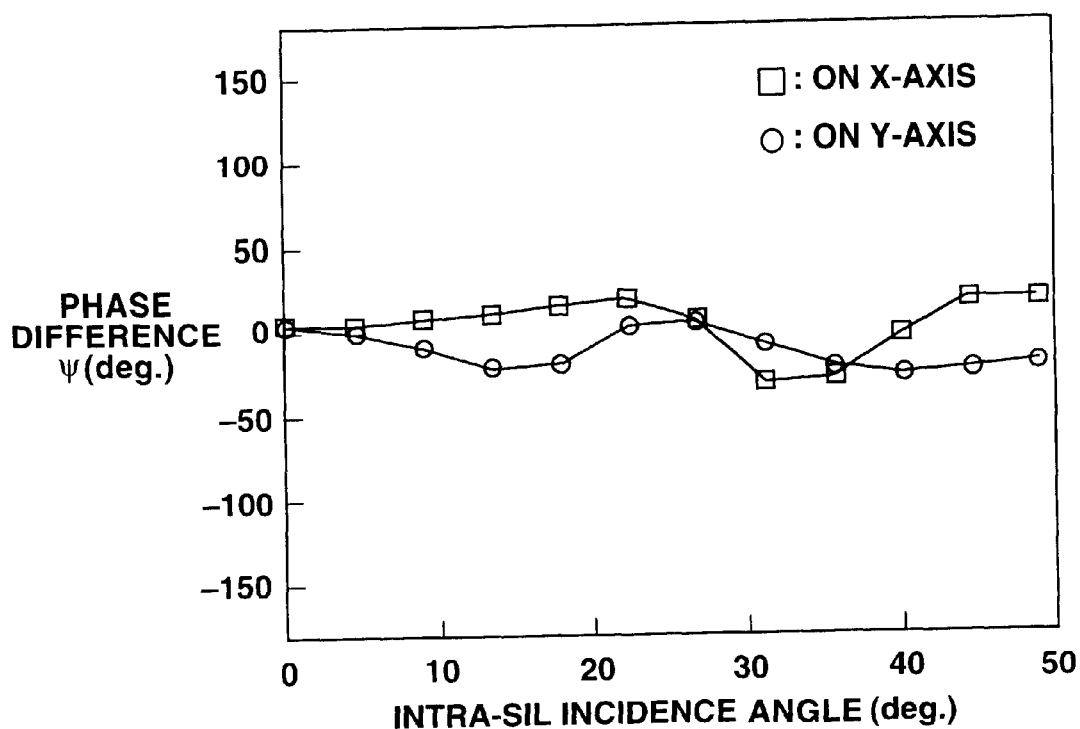
FIG. 43 shows a distribution on the x- and y-axes of a phase difference within the return light beam when the solid immersion lens and multi-layer optical thin film are constructed to meet the requirements specified in FIG. 40 an optically anisotropic optical element is used.
Figure 44:
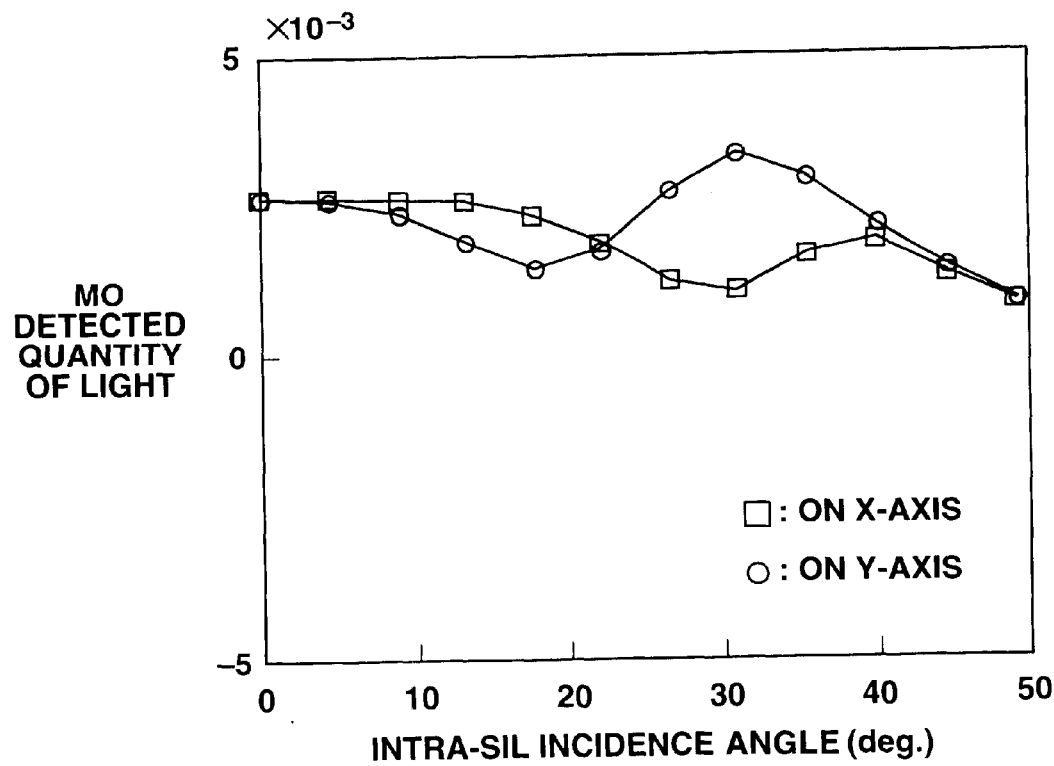
FIG. 44 shows a distribution on the x- and y-axes of an MO detected quantity of light within the return light beam when the solid immersion lens and multi-layer optical thin film are constructed to meet the requirements specified in FIG. 40 and an optically anisotropic optical element is used.

FIGS. 41 and 42 show distributions of phase difference and MO detected quantity of light when the optical element 41C is not used in the optical head 60. FIGS. 43 and 44 show distributions of phase difference and MO detected quantity of light when the optical element 41C is used. FIG. 41 shows the phase difference $\psi_x$ on the x-axis and phase difference $\psi_y$ on the y-axis when the optical element 41C is not used. FIG. 42 shows the MO detected quantity of light on the x-axis and MO detected quantity of light on the y-axis when the optical element 41C is not used. FIG. 43 shows the phase difference $\psi_x$ on the x-axis and phase difference $\psi_y$ on the y-axis when the optical element 41C is used. FIG. 44 shows the MO detected quantity of light on the x-axis and MO detected quantity of light on the y-axis when the optical element 41C is used.

In case the optical element 41C is not used, the phase differences $\psi_x$ and $\psi_y$ vary greatly depending upon the intra-SIL incidence angle as shown in FIG. 41. Therefore, the MO detected quantity of light varies greatly depending upon the intra-SIL incidence angle and is distributed with a large unevenness as shown in FIG. 42.

On the contrary, in case the optical element 41C is used, the phase differences $\psi_x$ and $\psi_y$ are nearly zero not depending upon the intra-SIL incidence angle as shown in FIG. 43. As a result, the MO detected quantity of light has a high level and is distributed evenly, not depending upon the intra-SIL incidence angle, as shown in FIG. 44.

In the optical heads 40 and 60, the optical elements 41 and 41C are disposed, respectively, in the optical path downstream of the beam splitter by which the return light is reflected and taken out. Namely, in the optical heads 40 and 60, the optical elements 41 and 41C are made to act on only the optical system for the return light, According to the present invention, however, the optical element may be disposed in a common optical path for both an incident light and return light.

Figure 45:
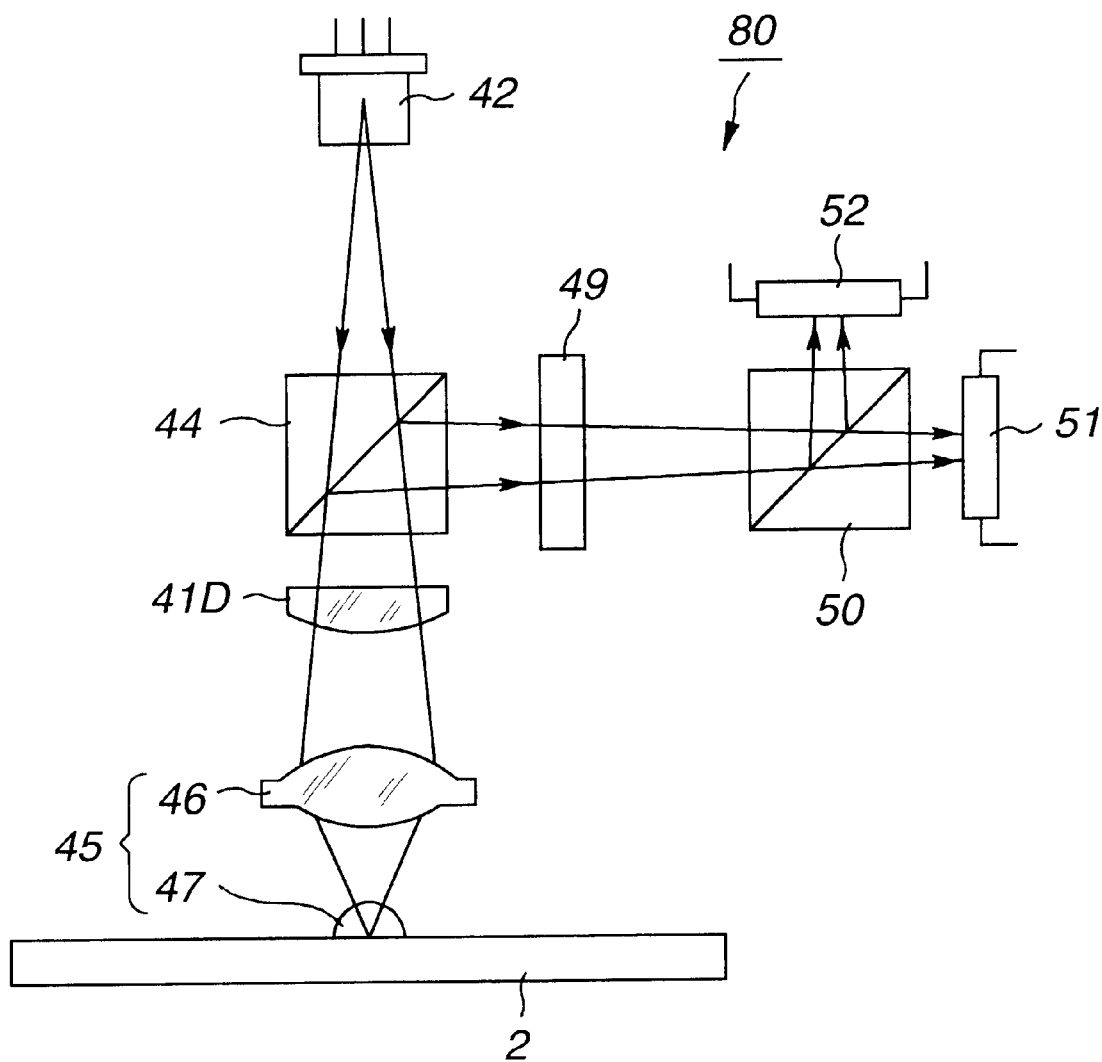
FIG. 45 shows the construction of a still another embodiment of optical head according to the present invention.

FIG. 45 shows the construction of a still another embodiment of optical head having an optically anisotropic optical element disposed in a common optical path for an incident light and return light. In FIG. 45, the same elements as in FIG. 27 are indicated with the same reference numerals in the optical head 40 in FIG. 27. The, optical head is generally indicated with a reference 80.

As shown in FIG. 45, the optical head 80 is constructed similarly to the optical head 40 in FIG. 27 except that the first and second collimator lenses 43 and 48 are not provided and an optically anisotropic optical element 41D is disposed between the beam splitter 44 and objective 45.

For reading a signal recorded in the MO disc 2 with the aid of the optical head 80, a linearly polarized laser light is emitted from the laser source 42, and guided by the beam splitter 44 and optical element 41D to be incident upon the objective 45. The objective 45 consists of the first lens 46 which converges the laser light having been transmitted through the beam splitter 44 and the solid immersion lens (SIL) 47 disposed opposite to the MO disc 2. The laser light incident upon the objective 45 is first converged by the first lens 46 and then incident upon the SIL 47. Then it is focused on, or in the proximity of, the end face of the SIL 47.

The incident laser light focused on, or in the proximity of, the end face of the SIL 47 is reflected by the multi-layer optical thin film. More particularly, the majority of the incident laser light is totally reflected at the end face of the SIL 47, while a part of the incident laser light arrives at the MO multilayer 7 of the MO disc 2 as an evanescent light leaking from the end face of the SIL 47 and is reflected by the MO multilayer 7.

The light thus returned, by reflected, from the multi-layer optical thin film is changed in polarization state depending upon a magnetized direction of the magnetic layer 5 forming the MO multilayer 7 under the polar Kerr effect of the magnetic layer 5. Then the return light is guided through the SIL 47 and first lens 46, to be incident upon the optical element 41D. The return light incident upon the optical element 41D has been converged by the first lens 46. The optical element 41D compensates the dependency of the phase difference of the return light upon the intra-SIL incidence angle.

The return light having the dependency of the phase difference upon the intra-SIL incidence angle thus compensated by the optical element 41D is incident upon the beam splitter 44 which will reflect the return light. The reflected return light is taken out. The return light reflected by the beam splitter 44 and taken out is guided by the half-wave plate 49 to be incident upon the polarizing beam splitter 50 which will split the return light into two polarized components whose polarized directions are orthogonal to each other.

Of the polarized light components split by the polarizing beam splitter 50, the one having been transmitted through the polarizing beam splitter 50 is detected by the first photodetector 51, whereas the other component is detected by the second photodetector 52. A magneto-optical signal (will be referred to as "MO signal" hereinafter) indicative of a magnetized direction of the magnetic layer 5 of the MO disc 2 is detected as a difference ($|I|^2 - |J|^2$) between an intensity of the polarized light detected by the first photodetector 51 and an intensity of the polarized light detected by the second photodetector 52.

In the optical head 80, the optical element 41D has the optical axis disposed perpendicularly to the optical axes of the incident light and return light and in parallel to the polarized direction of the incident light. Thus, the optical axis of the optical element 41D will be disposed in parallel to at least the flat side thereof Since the phase difference is a difference in phase between the two polarized beams orthogonal to each other, the optical element 41D will not act on the incident laser light when the optical axis of the optical element 41D is thus set. Therefore, when the optical axis of the optical element 41D is thus set, the optical element 41D will act on only the incident light, so that the dependency of the phase difference of the return light on the intra-SIL incidence angle can be compensated as in the optical heads 40 and 60.

Figure 46:
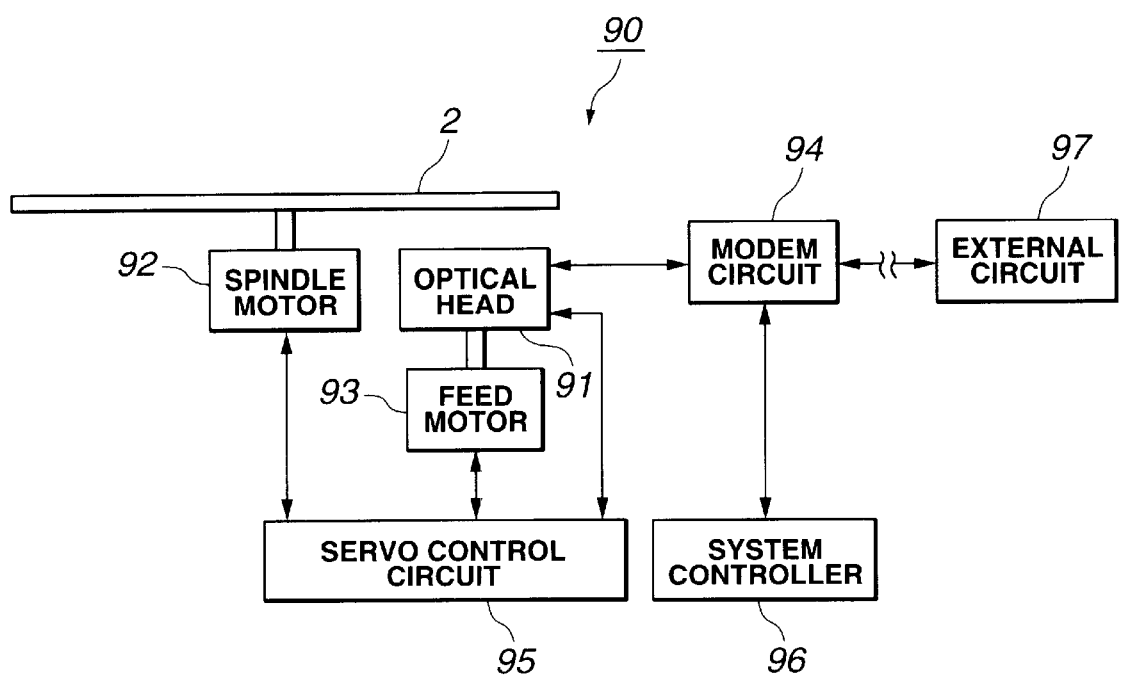
FIG. 46 shows the construction of an embodiment of optical recording and/or reproducing apparatus according to the present invention.

Referring now to FIG. 46, there is schematically illustrated an embodiment of optical recording and/or reproducing apparatus according to the present invention. The optical recording and/or reproducing apparatus is generally indicated with a reference 90.

As shown, the optical recording and/or reproducing apparatus 90 comprises an optical head 91 according to the present invention, a spindle motor 92 to drive to spin the MO disc 2, a feed motor 93 to move the optical head 91, a modem circuit 94 to modulate and demodulate a signal in predetermined manners, respectively, a servo control circuit 95 for servo control of the optical head 91, and a system controller 96 for control of the whole system.

The spindle motor 92 is controlled by the servo control circuit 95 to rotate at a predetermined speed. More specifically, the MO disc 2 to and/or from which a signal is written and/or read is chucked on the spindle motor 92, and driven to spin at a predetermined speed by the spindle motor 92 which is controlled by the servo control circuit 95.

To write and/or read an information signal, the optical head 91 irradiates a laser light to the MO disc 2 driven to spin and detects a return light from the MO disc 2. The optical head 91 is constructed according to the present invention as having been described in the foregoing (one of the optical heads 40, 60 and 80, for example) so that the dependency of the phase difference of return light upon the intra-SIL incidence angle is compensated by the optical element.

The optical head 91 is connected to the modem circuit 94. For reading an information signal from the MO disc 2, the optical head 91 irradiates a laser light to the MO disc 2 being rotated, detects a magneto-optical signal (will be referred to as "MO signal" hereinafter) from a return light from the MO disc 2, and supplies it to the modem circuit 94.

For writing an information signal to the MO disc 2, a signal is entered from an external circuit 97, modulated in a predetermined manner in the modem circuit 94, and supplied to the optical head 91. Based on the signal supplied from the modem circuit 94, the optical head 91 irradiates a laser light to the MO disc 2. Note that the optical recording and/or reproducing apparatus 90 further comprises means for applying a magnetic field for MO write (not shown). For writing an information signal, a magnetic field is also applied to the MO disc 2 based on the signal modulated in the predetermined manner in the modem circuit 94.

The optical head 91 is also connected to the servo control circuit 95. For write or read of an information signal to or from the MO disc 2, a focusing servo signal and tracking servo signal are generated from a light returned, by reflection, from the spinning MO disc 2 and supplied to the servo control circuit 95.

The modem circuit 94 is connected to the system controller 96 and external circuit 97. For write of an information signal to the MO disc 2, the modem circuit 94 is controlled by the system controller 96 to receive from the external circuit 97 and module in the predetermined manner, a signal for write into the MO disc 2. The signal modulated by the modem circuit 94 is supplied to the optical head 91.

Also, for reading an information signal from the MO disc 2, the modem circuit 94 is controlled by the system controller 96 to receive from the optical head 91 and demodulate it in the predetermined manner, an MO signal read from the MO disc 2. The signal demodulated from the modem circuit 94 is delivered from the modem circuit 94 to the external circuit 97.

The feed motor 93 is provided to move the optical head 91 to a predetermined radial position on the MO disc 2 when writing or reading an information signal to or from the MO disc 2. It is driven based on a control signal from the servo control circuit 95. That is, the feed motor 93 is connected to, and by, the servo control circuit 95.

The servo control circuit 95 is controlled by the system controller 96 to control the feed motor 93 in such a manner that the optical head 91 is moved to a predetermined position opposite to the MO disc 2. The servo control circuit 95 is also connected to the spindle motor 92, and connected by the system controller 96 to control the operation of the spindle motor 92. That is, for write or read of an information signal to or from the MO disc 2, the servo control circuit 95 controls the spindle motor 92 so that the MO disc 2 is rotated at a predetermined speed.

The servo control circuit 95 is also connected to the optical head 91. For write or read of an information signal to or from the MO disc 2, the servo control circuit 95 receives a servo signal from the optical head 91, and controls, based on the servo signal, the focusing servo and tracking servo of the optical head 91. Note that the focusing servo and tracking servo of the optical head 91 are controlled by moving the objective of the optical head 91 delicately with the aid of a biaxial actuator, for example, on which the objective is installed.

Since the aforementioned optical recording and/or reproducing apparatus 90 uses as the optical head 91 an optical head according to the present invention, the use of the solid immersion lens permits to use an objective having a large NA and assure a high quality of a signal written to or read from the MO disc 2. Therefore, the MO disc 2 can be formed to have a higher track density and track recording density.

In the foregoing, the magneto-optical disc is referred to as a recording medium, but the present invention is widely applicable wherever the dependency of phase difference of return light upon the intra-SIL incidence angle is a problem. The recording medium to which the present invention is applied is not limited to the magneto-optical disc.

As having been described in the foregoing, the present invention provides an optical head adopting the solid immersion lens to compensate the uneven distribution of the polarized light of a return light and capable of detecting a quality signal from the light returned, by reflection, from a recording medium.

In other words, the conventional optical head using a solid immersion lens permits to use an objective having a larger NA but cannot detect a quality signal. Although the optical head according to the present invention uses a solid immersion lens, it can detect a signal having a practically satisfactory quality.

Therefore, the present invention provides an optical head using the solid immersion lens to permit the use of an objective lens having such a large NA as to enable a higher track density and track recording density on a recording medium. As a result, the optical head according to the present invention enables to build a higher density, larger capacity optical recording and/or reproducing system.

Also, according to the present invention, a signal can be written or read with a higher quality. So, the optical head and the optical recording and/or reproducing apparatus using the optical head according to the present invention have a larger margin. Therefore, the optical head and recording and/or reproducing apparatus can be manufactured with inexpensive parts and with lower precision of adjustment. Thus, a more inexpensive optical head and recording and/or reproducing apparatus can be provided according to the present invention.

What is claimed is:

1. An optical head, comprising:
    a solid immersion lens supported opposite to a recording medium with a space between them, the space being smaller than the wavelength of a light used for write and/or read of a signal to and/or from the recording medium, an evanescent light from the end face of the solid immersion lens being used for write and/or read of a signal to and/or from the recording medium; and
    an optically anisotropic optical element formed with at least one nonplanar side, and disposed in the optical path of the light used for write and/or read of a signal to and/or from the recording medium.

2. The optical head as set forth in claim 1, wherein the optical element is formed spheric at at least one side thereof.

3. The optical head as set forth in claim 1, wherein the optical axis of the optical element is directed in the intra-plane direction of the optical element.

4. The optical head as set forth in claim 1, wherein an incident light upon the optical element is non-parallel.

5. The optical head as set forth in claim 1, wherein the optical element is disposed in the optical path of a light used for write and/or read of a signal to and/or from the recording medium and returned, by reflection, from the recording medium.

6. An optical recording and/or reproducing apparatus using an optical head for write and/or read of a signal to and/or from a recording medium, the optical head comprising:
    a solid immersion lens supported opposite to a recording medium with a space between them, the space being smaller than the wavelength of a light used for write and/or read of a signal to and/or from the recording medium, an evanescent light from the end face of the solid immersion lens being used for write and/or read of a signal to and/or from the recording medium; and
    an optically anisotropic optical element formed with at least one nonplanar side, and disposed in the optical path of the light used for write and/or read of a signal to and/or from the recording medium.

7. The apparatus as set forth in claim 6, wherein the optical element is formed spheric at at least one side thereof.

8. The apparatus as set forth in claim 6, wherein the optical axis of the optical element is directed in the intra-plane direction of the optical element.

9. The apparatus as set forth in claim 6, wherein an incident light upon the optical element is non-parallel.

10. The apparatus as set forth in claim 6, wherein the optical element is disposed in the optical path of a light used for write and/or read of a signal to and/or from the recording medium and returned, by reflection, from the recording medium.

* * * * *

UNITED STATES PATENT AND TRADEMARK OFFICE
CERTIFICATE OF CORRECTION

PATENT NO. : 6,473,385 B1
DATED : October 29, 2002
INVENTOR(S) : Kimihiro Saito

It is certified that error appears in the above-identified patent and that said Letters Patent is hereby corrected as shown below:

Column 1,
Line 11, change "adapted use" to -- adapted to use --;
Line 67, change "6f" to -- of --.

Column 2,
Line 35, change "t" to -- it --.

Column 3,
Line 43, change "difference" to -- different --.

Column 4,
Line 13, change "film" to -- film. --.

Column 5,
Line 23, change "magneto-optical," to -- magneto-optical --.

Column 7,
Line 19, change "40 an" to -- 40 when an --.

Column 8,
Line 64, change second "$(|I|^2 - |I|^2)$" to -- $(|I|^2 - |J|^2)$ --.

Column 9,
Line 1, change "returned,." to -- returned, --.

Column 10,
Line 1, change "direction of the and" to -- direction and --;
Line 13, change "multilayer" to -- multi-layer --;
Line 33, change "they be" to -- they can be --.

Column 11,
Line 6, change "r" to -- $r_{ps}$ --.

Column 12,
Line 2, change "resulted" to -- results --;
Line 22, change "cost." to -- cosø. --;
Line 24, delete "rash"
Line 30, change second "ψ" in line to -- ø --.

UNITED STATES PATENT AND TRADEMARK OFFICE
CERTIFICATE OF CORRECTION

PATENT NO. : 6,473,385 B1
DATED : October 29, 2002
INVENTOR(S) : Kimihiro Saito

It is certified that error appears in the above-identified patent and that said Letters Patent is hereby corrected as shown below:

Column 13,
Line 9, change "optical," to -- optical --;
Line 27, change "al" to -- a --;
Line 28, change "an-evanescent" to -- an evanescent --.

Column 14,
Line 44, change "$n_2$" to -- $n_e$ --.

Column 16,
Line 54, make "I" in "Intra" lowercase

Column 18,
Line 30, change "light," to -- light. --;
Line 39, change "The," to -- The --;
Line 65, change "reflected" to -- reflection --.

Column 19,
Line 35, change "thereof" to -- thereof. --.

Signed and Sealed this

Fourteenth Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,473,385 B1
APPLICATION NO. : 09/454765
DATED : October 29, 2002
INVENTOR(S) : Kimihiro Saito It is certified that error appears in the above-identified patent and that said Letters Patent is hereby corrected as shown below:

Column 1,
Line 11, change "adapted use" to -- adapted to use --;
Line 67, change "6f" to -- of --.

Column 2,
Line 35, change "t" to -- it --.

Column 3,
Line 43, change "difference" to -- different --.

Column 4,
Line 13, change "film" to -- film. --.

Column 5,
Line 23, change "magneto-optical," to -- magneto-optical --.

Column 7,
Line 19, change "40 an" to -- 40 when an --.

Column 8,
Line 64, change "second "$(|I|^2 - |I|^2)$" to -- $(|I|^2 - |J|^2)$ --.

Column 9,
Line 1, change "returned,." to -- returned, --.

Column 10,
Line 9, change "direction of the and" to -- direction and --;
Line 13, change "multilayer" to -- multi-layer --;
Line 33, change "they be" to -- they can be --.

Column 11,
Line 6, change "r" to -- $r_{ps}$ --.

Column 12,
Line 2, change "resulted" to -- results --;
Line 22, change "cost." to -- cosø. --;
Line 24, delete "rash"
Line 30, change second "ψ" in line to -- ø --.

UNITED STATES PATENT AND TRADEMARK OFFICE
CERTIFICATE OF CORRECTION

PATENT NO. : 6,473,385 B1
APPLICATION NO. : 09/454765
DATED : October 29, 2002
INVENTOR(S) : Kimihiro Saito It is certified that error appears in the above-identified patent and that said Letters Patent is hereby corrected as shown below:

Column 13,
Line 9, change "optical," to -- optical --;
Line 27, change "al" to -- a --;
Line 28, change "an-evanescent" to -- an evanescent --.

Column 14,
Line 44, change "$n_2$" to -- $n_e$ --.

Column 16,
Line 54, make "I" in "Intra" lowercase

Column 18,
Line 30, change "light," to -- light. --;
Line 39, change "The," to -- The --;
Line 65, change "reflected" to -- reflection --.

Column 19,
Line 35, change "thereof" to -- thereof. --.

This certificate supersedes Certificate of Correction issued October 14, 2003.

Signed and Sealed this

Twenty-eighth Day of November, 2006

JON W. DUDAS
*Director of the United States Patent and Trademark Office*